United States Patent
Josiam et al.

(10) Patent No.: US 8,306,095 B2
(45) Date of Patent: Nov. 6, 2012

(54) METHODS AND APPARATUS FOR NETWORK CODING IN A COMMUNICATION SYSTEM

(75) Inventors: Kaushik Morapakkam Josiam, Dallas, TX (US); Zhouyue Pi, Richardson, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 853 days.

(21) Appl. No.: 12/378,004

(22) Filed: Feb. 10, 2009

(65) Prior Publication Data

US 2009/0268790 A1 Oct. 29, 2009

Related U.S. Application Data

(60) Provisional application No. 61/071,451, filed on Apr. 29, 2008.

(51) Int. Cl.
H04B 3/36 (2006.01)
(52) U.S. Cl. ......................... 375/211; 370/328
(58) Field of Classification Search .................. 370/328; 375/211
See application file for complete search history.

(56) References Cited

U.S. PATENT DOCUMENTS

| | | | | |
|---|---|---|---|---|
| 5,856,804 A | * | 1/1999 | Turcotte et al. | 342/371 |
| 7,873,113 B2 | * | 1/2011 | Takano et al. | 375/267 |
| 2007/0149117 A1 | | 6/2007 | Hwang et al. | |
| 2008/0192705 A1 | * | 8/2008 | Suzuki | 370/335 |
| 2009/0268662 A1 | * | 10/2009 | Larsson et al. | 370/328 |

FOREIGN PATENT DOCUMENTS

| KR | 100787969 | 12/2007 |
|---|---|---|
| WO | WO-2006071187 | * 7/2006 |

OTHER PUBLICATIONS

International Search Report dated Dec. 3, 2009 in connection with PCT Application No. PCT/KR2009/002228.

* cited by examiner

*Primary Examiner* — Leon-Viet Nguyen

(57) ABSTRACT

A system and method for relaying communications in a wireless communication network. A relay station capable of relaying wireless communications includes a plurality of receiver antennas and a plurality of transmitter antennas. The plurality of receiver antennas is operable to receive, in a first time interval, a first communication from a base station and a second communication from a subscriber station. The plurality of transmitter antennas is operable transmit a third communication to the base station and the subscriber station in a second time interval. The relay station also includes a network encoder. The network encoder is configured to generate a combined symbol constellation. The combined symbol constellation is generated by combining a first symbol constellation transmitted in said first communication with a second symbol constellation transmitted in said second communication. Further, the third communication comprises said combined symbol constellation.

20 Claims, 16 Drawing Sheets

METHODS AND APPARATUS FOR NETWORK CODING IN A COMMUNICATION SYSTEM

CROSS-REFERENCE TO RELATED APPLICATION(S) AND CLAIM OF PRIORITY

The present application is related to U.S. Provisional Patent No. 61/071,451, filed Apr. 29, 2008, entitled "Method And Apparatus For Network Coding In A Communication System". Provisional Patent No. 61/071,451 is assigned to the assignee of the present application and is hereby incorporated by reference into the present application as if fully set forth herein. The present application hereby claims priority under 35 U.S.C. §119(e) to U.S. Provisional Patent No. 61/071,451.

TECHNICAL FIELD OF THE INVENTION

The present application relates generally to apparatus and a method for relaying communications and, more specifically, to an apparatus and a method for coding communications in a multi-hop relay wireless communication system.

BACKGROUND OF THE INVENTION

A typical cellular radio system consists of a collection of fixed base stations (BS) that define the radio coverage areas or cells. Typically, a non-line-of-sight (NLOS) radio propagation path exists between a base station and a mobile station (MS) due to natural and man-made objects that are situated between the base station and the mobile station. As a consequence, the radio waves propagate via reflections, diffractions and scattering. However, even with non-line-of-sight propagation, there exist scenarios where the MS cannot receive the signal with enough viability to maintain connection to the BS. For example, when the MS is outside the coverage area of the BS or in a deadspot like the basement of a building. In such scenarios, relays are inserted to augment transmission capabilities of the transmitter, in order that the MS may receive the data meant for it.

Relay stations (hereinafter "RS") are added to wireless communication networks to increase the coverage range, user data rates, or both, and typically are placed at the periphery of the cellular coverage area. A multi-hop network facilitates communication between a base station (hereinafter "BS") and subscriber stations (also referred to as mobile stations) in the extended coverage area provided by a relay station. In a multi-hop network, a signal from a source may reach its destination in multiple hops through the use of the Relay stations. Relay stations typically boost the downlink (base station to the subscriber station) and uplink (subscriber station to the base station) signals regardless of whether the relay station is a fixed relay station (hereinafter "RS") or a mobile relay station. Current relaying solutions fail to effectively increase system coverage while employing power saving mechanisms at the relay stations. Moreover, no procedures are currently available for effectively managing load conditions, such as the number of received and transmitted data and acknowledgment packets at the relay stations.

SUMMARY OF THE INVENTION

A relay station capable of relaying wireless communications is provided. The relay station includes a plurality of receiver antennas and a plurality of transmitter antennas. The plurality of receiver antennas is operable to receive a first communication from a base station and a second communication from a subscriber station. The plurality of transmitter antennas is operable to transmit a third communication to the base station and the subscriber station. The relay station also includes a network encoder. The network encoder is configured to generate a combined symbol constellation. The combined symbol constellation is generated by combining a first symbol constellation transmitted in said first communication with a second symbol constellation transmitted in said second communication. Further, the third communication comprises said combined symbol constellation.

A wireless communication network is provided. The wireless communication network includes a plurality of relay stations; each one of said relay stations is capable of relaying communications between a base station and a subscriber station. At least one of the relay stations includes a plurality of receiver antennas and a plurality of transmitter antennas. The plurality of receiver antennas is operable to receive a first communication from a base station and a second communication from a subscriber station. The plurality of transmitter antennas is operable to transmit a third communication to the base station and the subscriber station. The relay station also includes a network encoder. The network encoder is configured to generate a combined symbol constellation. The combined symbol constellation is generated by combining a first symbol constellation transmitted in said first communication with a second symbol constellation transmitted in said second communication. Further, the third communication comprises said combined symbol constellation.

A method for relaying communications in a wireless communication network is provided. The method includes receiving a first communication from a base station and a second communication from a subscriber station. The first communication comprises a first symbol constellation and the second communication comprises a second symbol constellation. The method also includes combining, at the symbol level, the first symbol constellation with the second symbol constellation to generate a third symbol constellation. Further, the method includes transmitting the third symbol constellation to both the base station and the subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

With regard to the following description, it is noted that the LTE term "node B" is another term for "base station" used below. Also, the LTE term "user equipment" or "UE" is another term for "subscriber station" used below.

Further, the following references: Ahlswede, R, N Cai, S.-Y. R Li, and R. W. Yeung, "Network Information Flow" *IEEE Transactions on Information Theory* 46, no. 4 (July 2000): 1204-1216; Katti, Sachin, H Rahul, W Hu, D Katabi, M Medard, and J Crowcroft "XORs in the Air: Practical Wireless Network Coding" *Proceedings of ACM SIGCOMM* 2006, September 2006; Katti, Sachin, Shyamanath Gollakota, and Dina Katabi "Embracing Wireless Interference: Analog Network Coding" *ACM SIGCOMM*, Kyoto, Japan, 2007; Khan, Farooq, System and Method for Subcarrier Allocation in a Wireless Multihop Relay Network, US Patent Application 2006/0209671 A1; Li, S.-Y. R, R. W Yeung, and N Cai "Linear Network Coding" *IEEE Transactions on Information Theory* 49, no. 2 (February 2003): 371-381; Liu, Zhiqiang, Yan Xin, and Georgios Giannakis "Linear Constellation Precoding for OFDM with maximum multipath diversity and coding gains" *IEEE Transactions on Communications* 51, no. 3 (March 2003): 416-427; Zhang, Shengli, Soung-Chang Liew, and Patrick P. Lam "Physical-Layer Network Coding" Proceedings of ACM Mobicom, Los Angeles, (2006); and Dina Katabi, Rahul Hariharan, Sachin Katti, "Methods and apparatus for network coding", US Patent application—2008/0075080 A1 are hereby incorporated by reference in their entirety.

Figure 1:
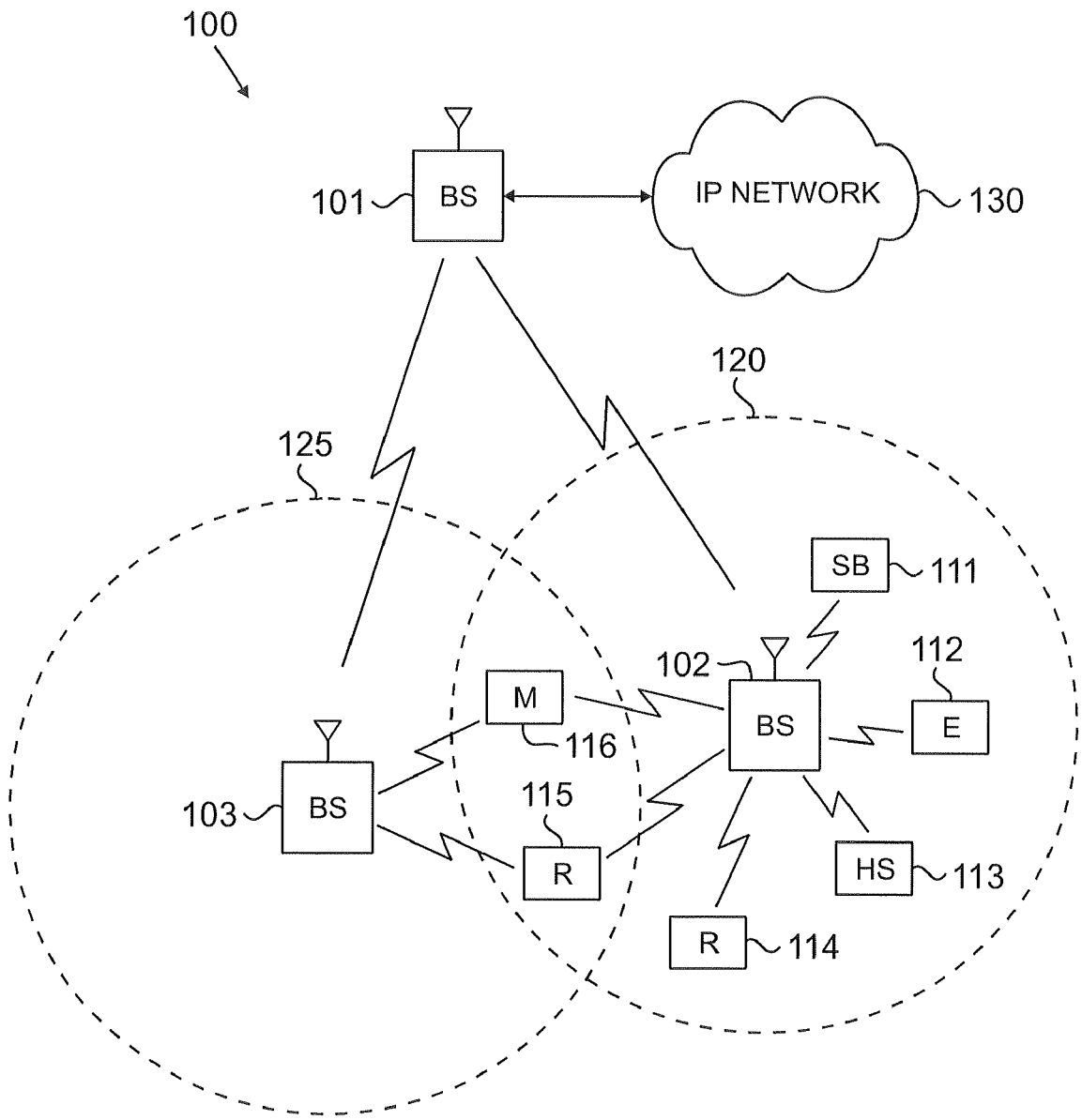
FIG. 1 illustrates exemplary wireless network 100 that is capable of decoding data streams according to an exemplary embodiment of the disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIP-ERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 500 meters to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. In some embodiments, a maximum likelihood (ML) is utilized to decode the plurality of data streams received as a combined data stream from the plurality of transmit antennas. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
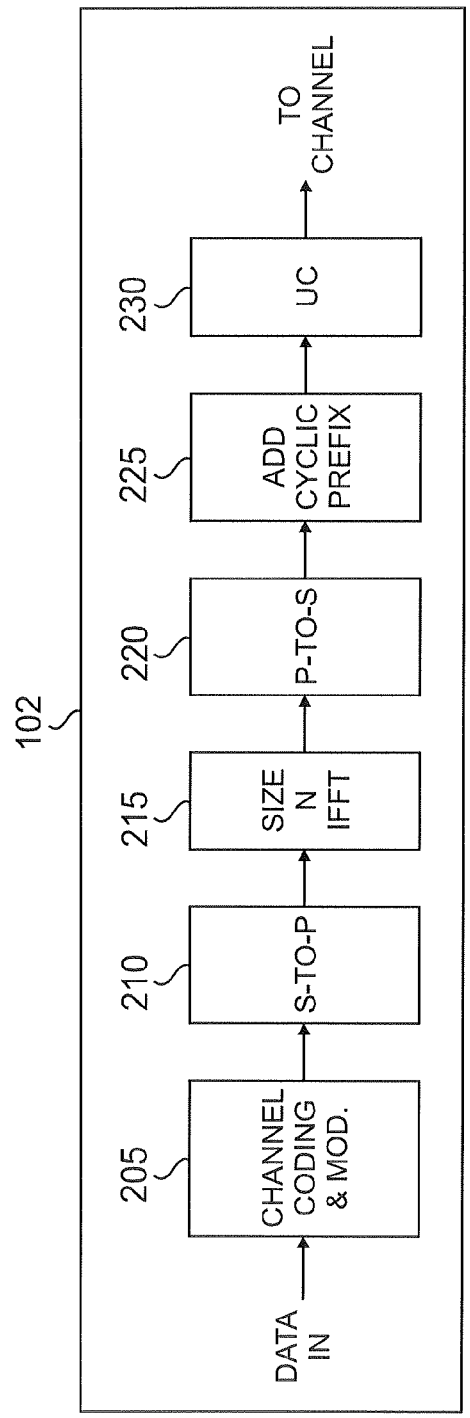
FIG. 2A illustrates a high-level diagram of an orthogonal frequency division multiple access (OFDMA) transmit path according to an exemplary embodiment of the disclosure
Figure 2B:
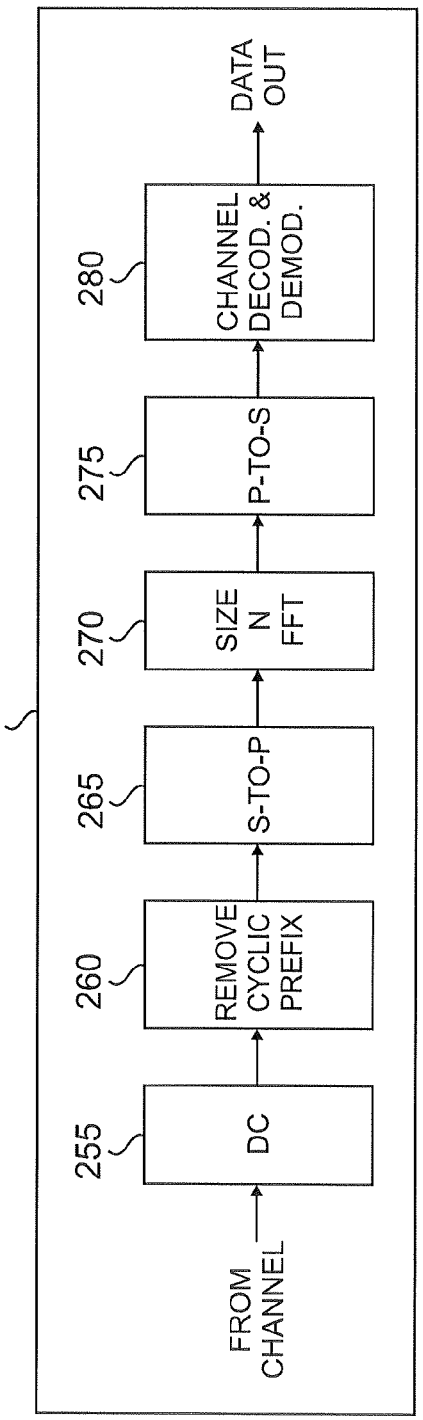
FIG. 2B illustrates a high-level diagram of an orthogonal frequency division multiple access (OFDMA) receive path according to an exemplary embodiment of the disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In some embodiments disclosed herein, data is transmitted using QAM. QAM is a modulation scheme which conveys data by modulating the amplitude of two carrier waves. These two waves are referred to as quadrature carriers, and are generally out of phase with each other by 90 degrees. QAM may be represented by a constellation that comprises $2^x$ points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that constellations with more than four points additional information (e.g., reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the subscriber station, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
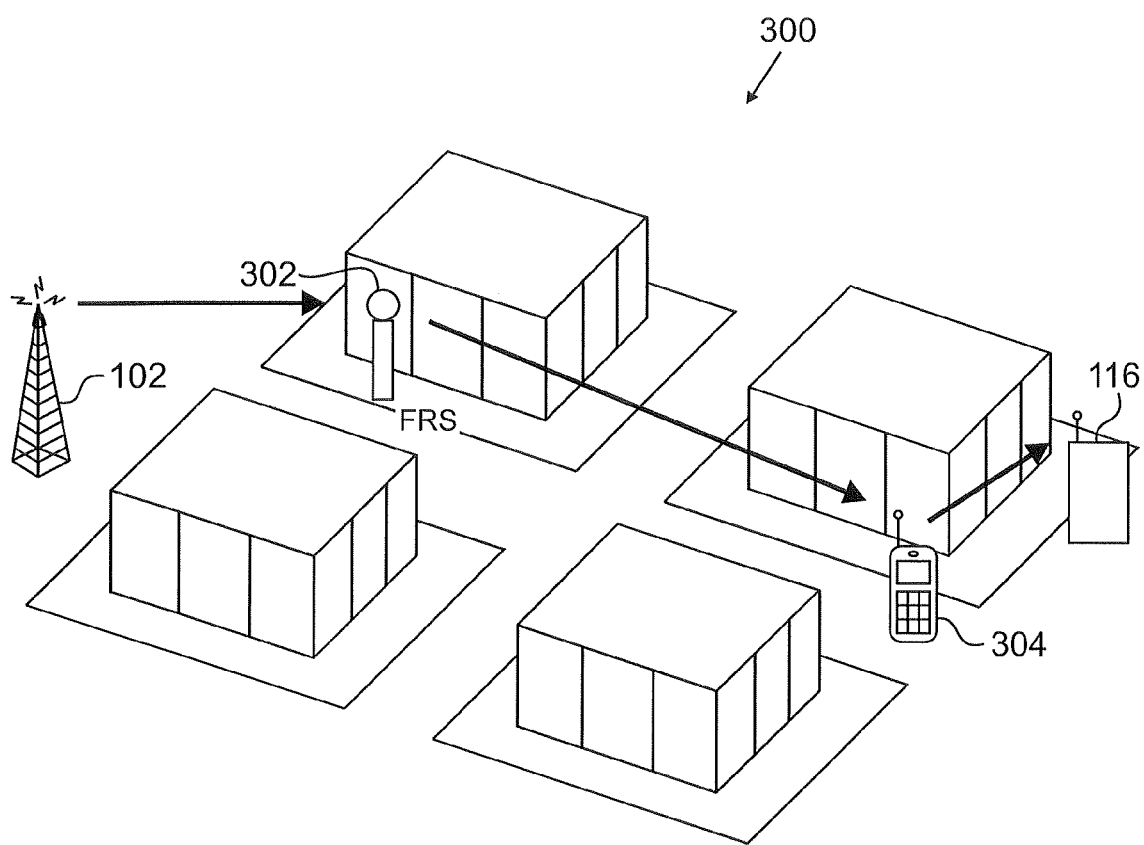
FIG. 3 illustrates an exemplary multi-hop cellular network according to embodiments of the present disclosure.

FIG. 3 illustrates a multi-hop cellular network 300 according to an embodiment of the present disclosure. The embodiment of the multi-hop cellular network 300 shown in FIG. 3 is for illustration only. Other embodiments of the multi-hop cellular network 300 can be used without departing from the scope of this disclosure.

Multi-hop cellular network 300 includes the use of, for example, a fixed relay station (RS) 302 and a mobile relay station (MRS) 304. Mobile relay station 304 may be a dedicated relay station or mobile relay station (MRS) 304 may be a subscriber station (SS) operable to act as a relay station (RS) 302. Multi-hop cellular network 300 forms a multi-hop link between a base station (BS) 102 and a subscriber station (SS) 116 outside the coverage area of BS 102. Multi-hop cellular network 300 extends the coverage range, user data rates and coverage area of a base station (BS) 102. Multi-hop cellular network 300 provides a method and procedure for coverage or range expansion, load control and balancing, and power savings for the relay station. In addition, RS 302 and MRS 304 may extend the coverage of a cellular network 300 by providing transmission and reception links for other subscriber stations (not shown) outside the coverage area of BS 102.

According to one embodiment of the present disclosure, RS 302 is hard-wired to the base station 102, while MRS 304 is wirelessly connected to BS 102. Alternatively, RS 302 may be a nomadic relay station wirelessly connected to BS 102. Although the following primarily describes embodiments of the present disclosure in conjunction RS 302, it should be understood that other suitable relay stations, such as relay station MRS 304, may also be used.

The transmission power level of RS 304 is power controlled to keep the power level at a minimum while allowing communication with base stations. Thus, in accordance with one embodiment of the present disclosure, MRS 304 effectively reduces interference within the network and thus assists towards an increase in the capacity of cellular network 300. In one embodiment of the present disclosure, RS 302 generally includes two modes of operation.

Relaying can be performed in digital or analog manners. In the case of digital relaying, sometimes referred to as "regenerative relaying" or "decode and forward relaying," a RS 302 digitally decodes and re-encodes the relayed signal before retransmission.

Figure 4:
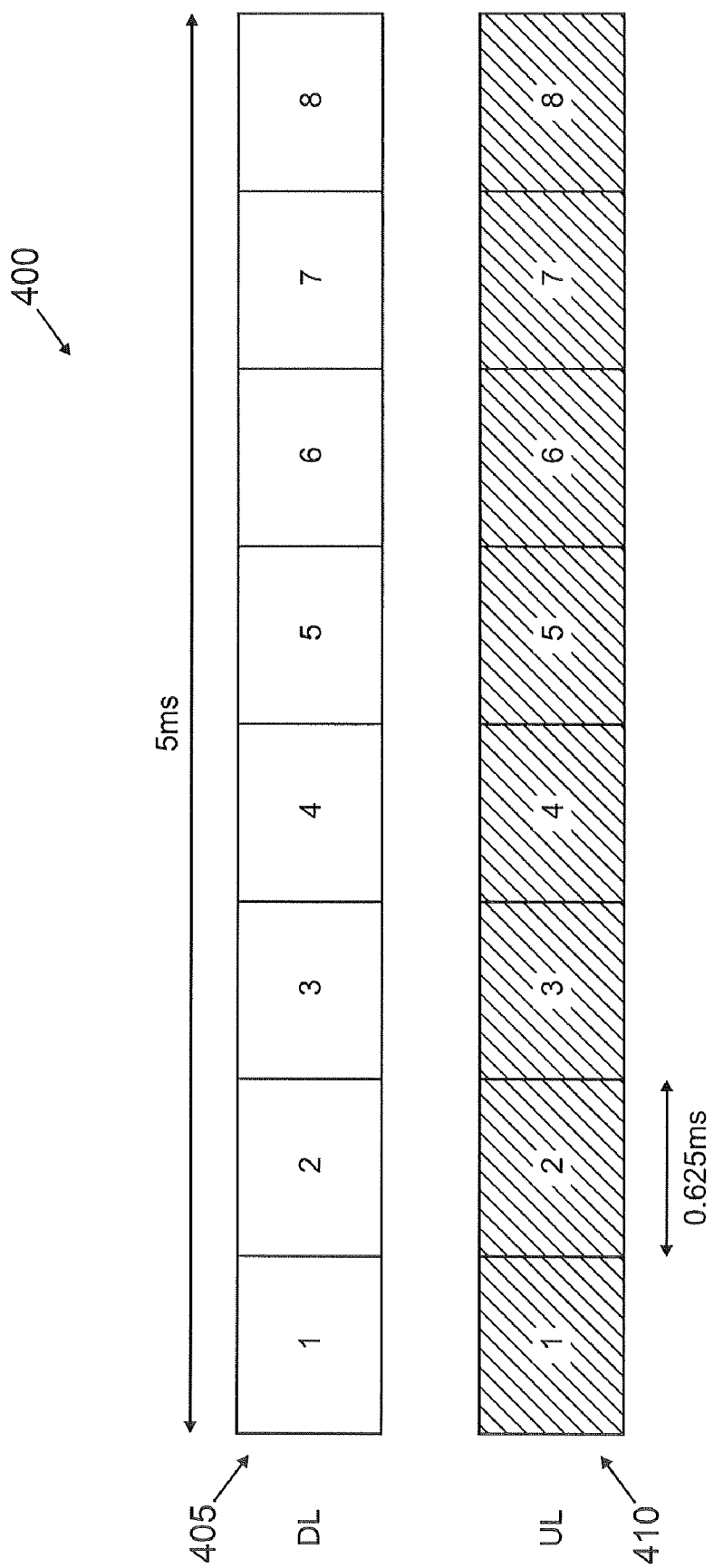
FIG. 4 illustrates a frequency division duplex (FDD) system according to embodiments of the present disclosure.

FIG. 4 illustrates a frequency division duplex (FDD) system according to embodiments of the present disclosure. The embodiment of the FDD system 400 shown in FIG. 4 is for illustration only. Other embodiments of the FDD system 400 can be utilized without departing from the scope of this disclosure.

When the subcarriers are allocated to different users in a multiuser scenario, as in a cellular system, the OFDM system is referred to as an Orthogonal frequency division multiple access (OFDMA) system. In the cellular system, the base station 102 communicates with many subscriber stations 111, 112, 113, 114, 115 and 116. The communication from the BS 102 to an SS (SS 116 for example) is called downlink (DL) while the communication from SS (SS 116 for example) to BS 102 is called uplink (UL). Each SS 111, 112, 113, 114, 115 and 116 is allocated a set of subcarriers based on a complex scheduling algorithm taking into account the demand from the SS, the overall demand from all other SSs, fairness and quality of service constraints. The subcarrier allocation can change dynamically over time. DL and UL communications are separated in either the frequency domain or using time domain. If downlink and uplink separation is enforced in the frequency domain using different carrier frequencies, then the system is a FDD system 400. In an FDD system 400, the downlink (DL) 405 and uplink (UL) 410 transmissions happen simultaneously on different frequency bands. The transmission in time is divided into timeslots referred to as subframes.

Figure 5:
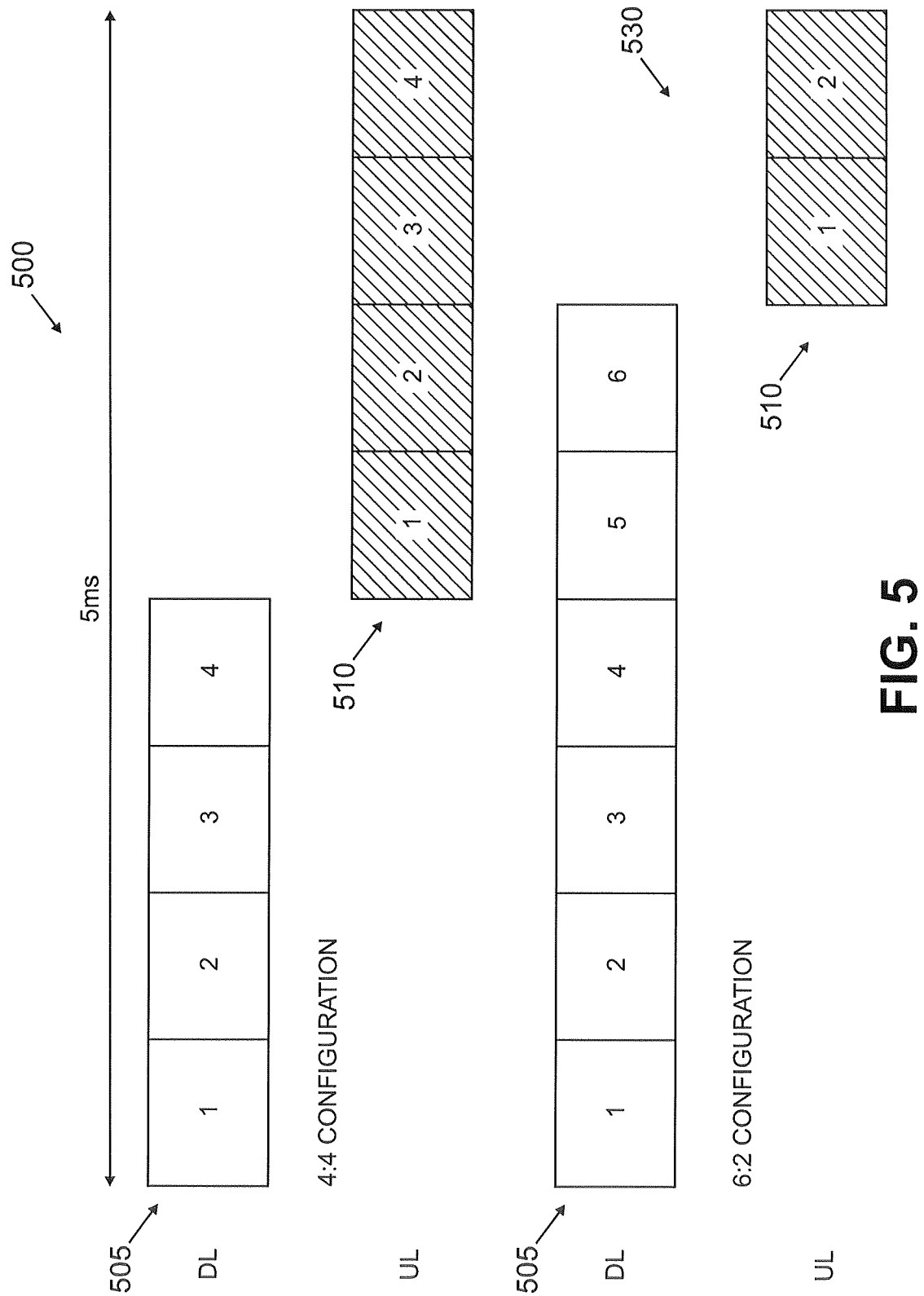
FIG. 5 illustrates a time division duplex (TDD) system according to embodiments of the present disclosure.

FIG. 5 illustrates a time division duplex (TDD) system according to embodiments of the present disclosure. The embodiment of the TDD system 500 shown in FIG. 5 is for illustration only. Other embodiments of the TDD system 500 can be utilized without departing from the scope of this disclosure.

Systems where uplink and downlink transmissions are separated in time are called time division duplex systems 500. In a TDD system 500, a single frequency band 515 is used for downlink 505 and uplink 510 transmission. The transmission time 520 can be shared between downlink 505 and uplink 510 in different proportions such as four:four (4:4) 525 (four subframes downlink and four subframes in the uplink) or six:two (6:2) 530 configuration. An advantage of TDD systems is that uplink and downlink channel is symmetric which allows for downlink channel quality and channel estimation at the base station from uplink transmissions. In a FDD system, a subscriber station calculates channel quality and information from downlink pilot transmissions and feeds back to the base station on a feedback channel.

BS 102, Relay 302 and SS 116 communicate using a pre-agreed access scheme. For example, in IEEE 802.16m, BS 102, Relay 302 and SS 116 communicate using OFDM as their preferred radio access scheme while the downlink/uplink implementation is left to the operator and can be either TDD 500 or FDD 400.

Figure 6:
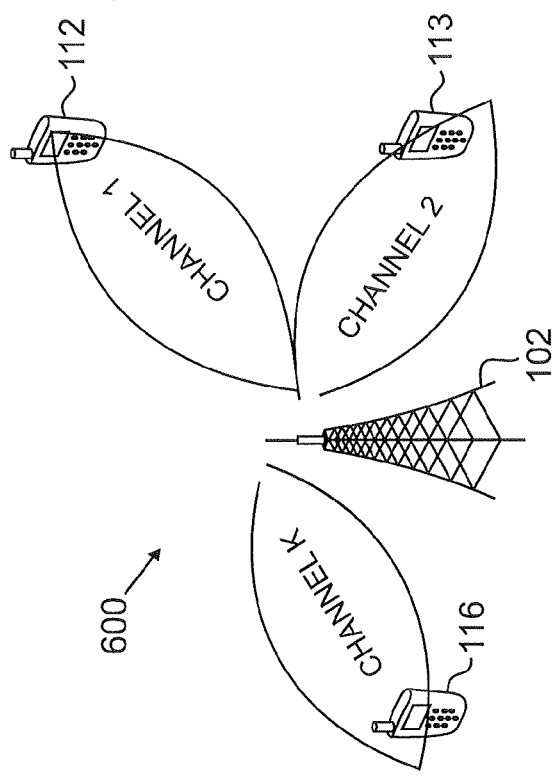
FIG. 6 illustrates a Space Division Multiple Access (SDMA) system according to embodiments of the present disclosure.

FIG. 6 illustrates a Space Division Multiple Access (SDMA) system 600 according to embodiments of the present disclosure. The embodiment of the SDMA system 600 shown in FIG. 6 is for illustration only. Other embodiments of the SDMA system 600 can be used without departing from the scope of this disclosure.

As mentioned earlier, subscriber stations can be separated in time or frequency. In embodiments where multiple antennas are deployed at the transmitters and receivers, subscriber stations can be separated based on antenna directionality. This subscriber station separation based on directionality (spatial domain) is called space division multiple access (SDMA) 600. As illustrated in FIG. 6, two subscriber stations with angular separations that exceed the angular resolution of the directional antenna are assigned channels for transmission on the same time, frequency resource.

Figure 7:
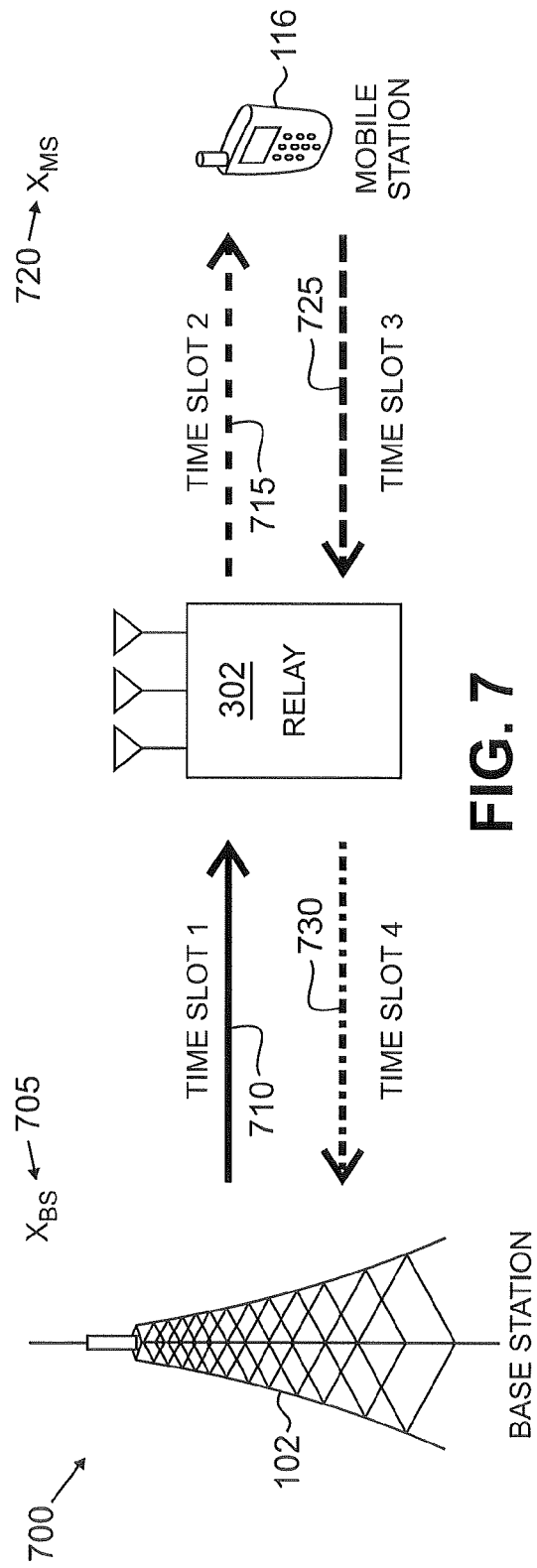
FIG. 7 illustrates a relay operation in a TDD System according to embodiments of the present disclosure.

FIG. 7 illustrates a relay operation 700 in a TDD System 500 according to embodiments of the present disclosure. The embodiment of the relay operation 700 shown in FIG. 7 is for illustration only.

In communications where relay stations are involved, relay stations operate as data forwarding devices. Specifically, relay stations detect data from the transmitter and process it for transmission to receiver. The transmitter is the BS 102 on the downlink 505 and SS 116/RS 302 on the uplink 510. Popular processing functions at RS 302 take one of the following three forms: i) amplify and forward; ii) decode and forward; and iii) compress and forward. In processing the data from the transmitter, RS 302 generates no data of its own to the receiver, but only replicates the signal from the transmitter and forwards the signal to the receiver.

In some embodiments, intelligent coding is performed at RS 302. Intelligent coding at RS 302 can improve overall system throughput. This coding approach to relaying is termed network coding.

For example, where BS 102 and SS 116 are going to exchange a couple of packets. Since SS 116 is not in the coverage area of BS 102, SS 116 has to communicate through RS 302. In TDD system 500 implementations, BS 102 transmits the packet ($x_{BS}$) 705 to the RS 302 in a time slot $t_1$ 710. RS 302 forwards the packet 705 to SS 116 in time slot $t_2$ 715. Similarly, SS 116 transmits a second packet ($x_{MS}$) 720 to RS 302 in time slot $t_3$ 720. RS 302 transmits the second packet 720 to BS 102 in time slot $t_4$ 725. Therefore, a total of four (4) time slots are used to exchange packets 705, 720 between BS 102 and SS 116.

Figure 8:
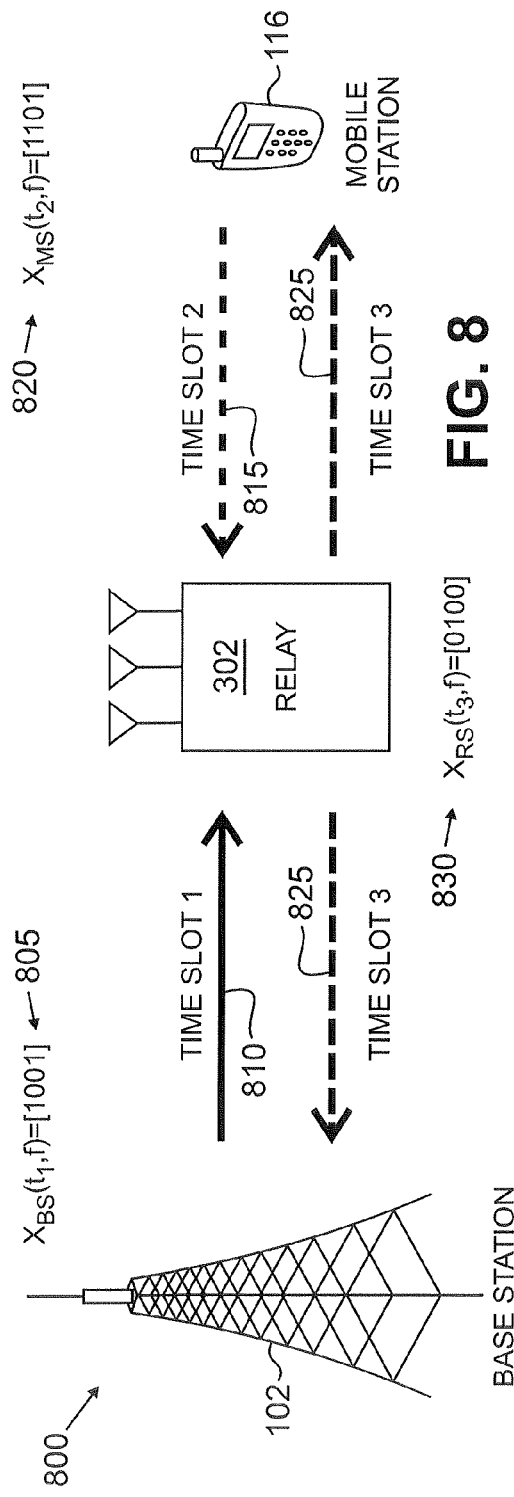
FIG. 8 illustrates a bit level coding relay operation in a TDD System according to embodiments of the present disclosure.

FIG. 8 illustrates a bit level coding relay operation 800 in a TDD System 500 according to embodiments of the present disclosure. The embodiment of the bit level coding relay operation 800 shown in FIG. 8 is for illustration only. Other embodiments of the bit level coding relay operation 800 can be used without departing from the scope of this disclosure.

In the bit level coding relay operation 800, RS 302, receives a first packet 805 from BS 102 in time slot $t_1$ 810. Additionally, RS 302 receives a second packet 820 from SS 116 in time slot $t_2$ 815. Thereafter, RS 302 XORs the two packets 805, 820 into a combined packet 830. RS 302 then broadcasts the combined packet 830 to both BS 102 and SS 116 in time slot $t_3$ 825. BS 102 recovers the message (e.g., second packet 820) from SS 116 by XOR-ing the combined packet 830 again with the first packet 805. SS 116 recovers the message (e.g., first packet 805) from BS 102 by XOR-ing the combined packet 803 with the second packet 820. Thus, coding at RS 302 saves a time slot, which consequently results in improving the system throughput. A similar example can be constructed for the FDD system 400 and shown that intelligent coding at RS 302 saves time.

The above illustrative examples, show network coding at the bit level 800. In additional embodiments, more sophisticated bit level Galois field $GF(2^n)$ coding operations are used by RS 302. Thus network coding implicitly assumes that RS 302 decodes bits to perform coding operations.

Additional embodiments do not require decoding at the receiver to perform network coding. Such embodiments rely on addition at the symbol level to mimic network coding. This symbol level addition at RS 302 is referred to as physical layer network coding. Physical layer network coding takes advantage of natural collision between two symbols when transmitted using the same time-frequency resource. The basic operation of physical layer network coding is as follows: In a first time slot ($t_1$), BS 102 and SS 116 transmit symbols $x_{BS}(t,f)$ and $x_{MS}(t,f)$ respectively to RS 302 at the same time and frequency. Assuming perfect symbol level synchronization, RS 302 receives $x_{BS}(t,f)+M_{SS}(t,f)$. RS 302 then transmits, in a second time slot ($t_2$), $x_{BS}(t,f)+x_{MS}(t,f)$. BS 102 receives $x_{BS}(t,f)+x_{MS}(t,f)$ from RS 302. BS 102 cancels $x_{BS}(t,f)$ from the signal to recover the symbol transmitted by SS 116 (e.g., to recover $x_{MS}(t,f)$). SS 116 receives $x_{BS}(t,f)+x_{MS}(t,f)$ from RS 302. BS 102 cancels $x_{MS}(t,f)$ from the signal to recover the symbol transmitted by BS 102 (e.g., to recover $x_{BS}(t,f)$). Thus, in two timeslots SS 116 and BS 102 have completely exchanged their information. This symbol level addition has one important advantage over the bit level addition in that it enables RS 302 to combine two interfering sources without the need for a lot of processing. The specific symbol addition is no different from network coding since they be mapped to GF($2^n$) addition of digital bit streams.

Figure 9:
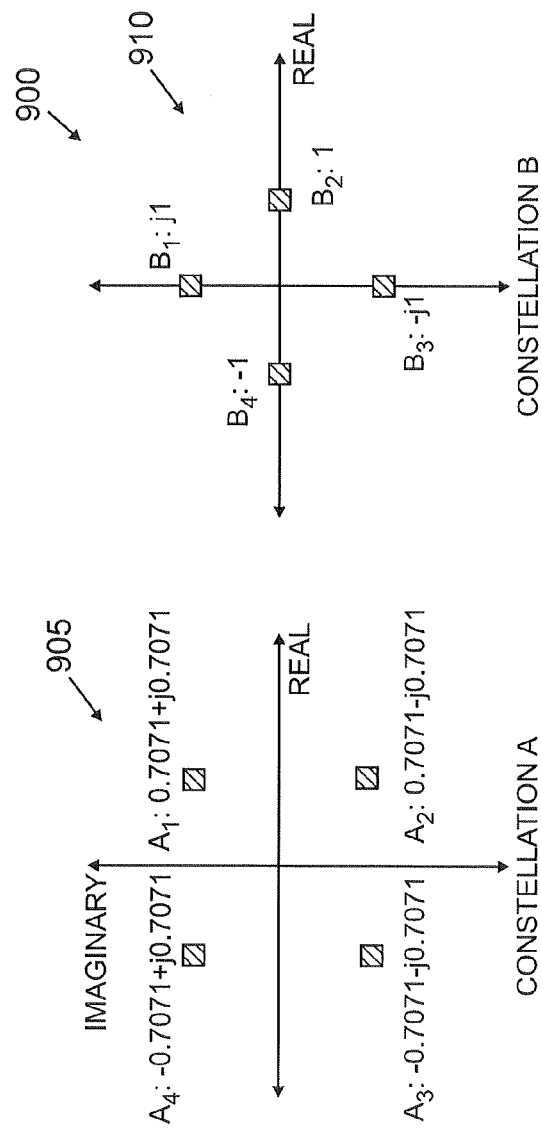
FIG. 9 illustrates QPSK constellations according to embodiments of the present disclosure.

FIG. 9 illustrates QPSK constellations 900 according to embodiments of the present disclosure. The embodiment of the QPSK constellations 900 shown in FIG. 9 is for illustration only. Other embodiments of the QPSK constellations 900 can be used without departing from the scope of this disclosure.

In some embodiments, constellation B 910 is derived by rotating constellation A 905 by forty-five degrees (45°) As such, constellation B 910 is defined by Equation 1:

$$B_i = e^{j\frac{\pi}{4}} A_i. \qquad [\text{Eqn. 1}]$$

Therefore, constellation B 910 is generated by rotating constellation A 905 by forty-five degrees (45°).

Figure 10:
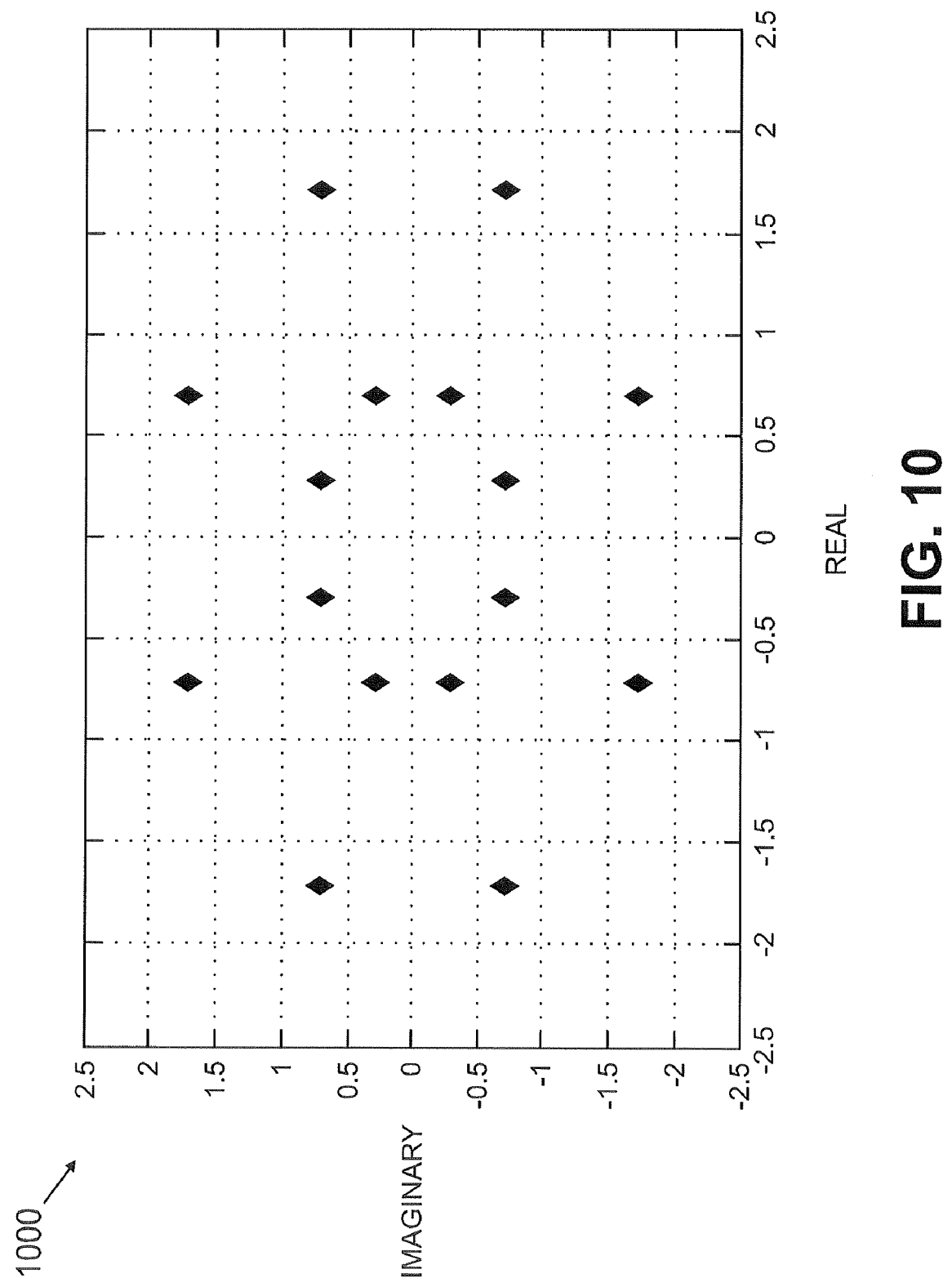
FIG. 10 illustrates a constellation C according to embodiments of the present disclosure.

In some embodiments, RS 302 is configured to add constellation A 905 and constellation B 910. The addition of symbols A and B (e.g., constellation A 905 and constellation B 910) results in a new symbol C, e.g., constellation C 1000. FIG. 10 illustrates constellation C 1000 according to embodiments of the present disclosure. The embodiment of the constellation C 1000 shown in FIG. 10 is for illustration only. Other embodiments of constellation C 1000 can be used without departing from the scope of this disclosure.

Constellation C 1000 is made up of sixteen (16) points. Each point of constellation C 1000 corresponds to the sixteen (16) different additions as shown in FIG. 10. Accordingly, combining constellations A 905 and B 910 results in a new constellation (e.g., constellation C 1000) whose elements are a unique map to points in constellation A 905 and constellation B 910.

Figure 11:
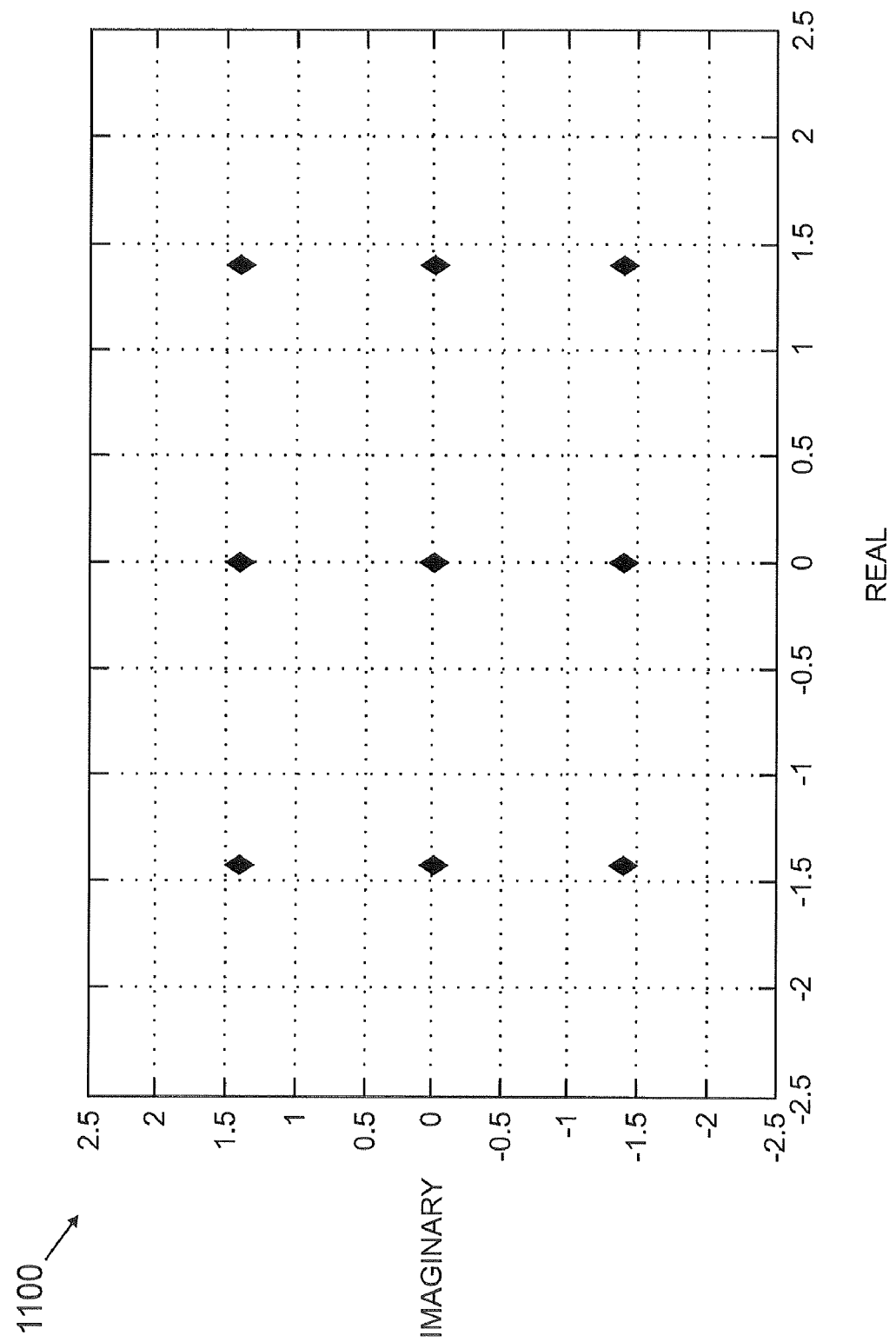
FIG. 11 illustrates another constellation according to embodiments of the present disclosure.

FIG. 11 illustrates constellation D 1100 according to embodiments of the present disclosure. The mapping is not unique if constellation A 905 is added with another constellation A 905. When two constellation A's 905 are added, a constellation D 1100 results. Combining the same QPSK constellation twice results in a many-to-one mapping, with the sixteen (16) additions mapping to only nine (9) different constellation points.

Figure 12:
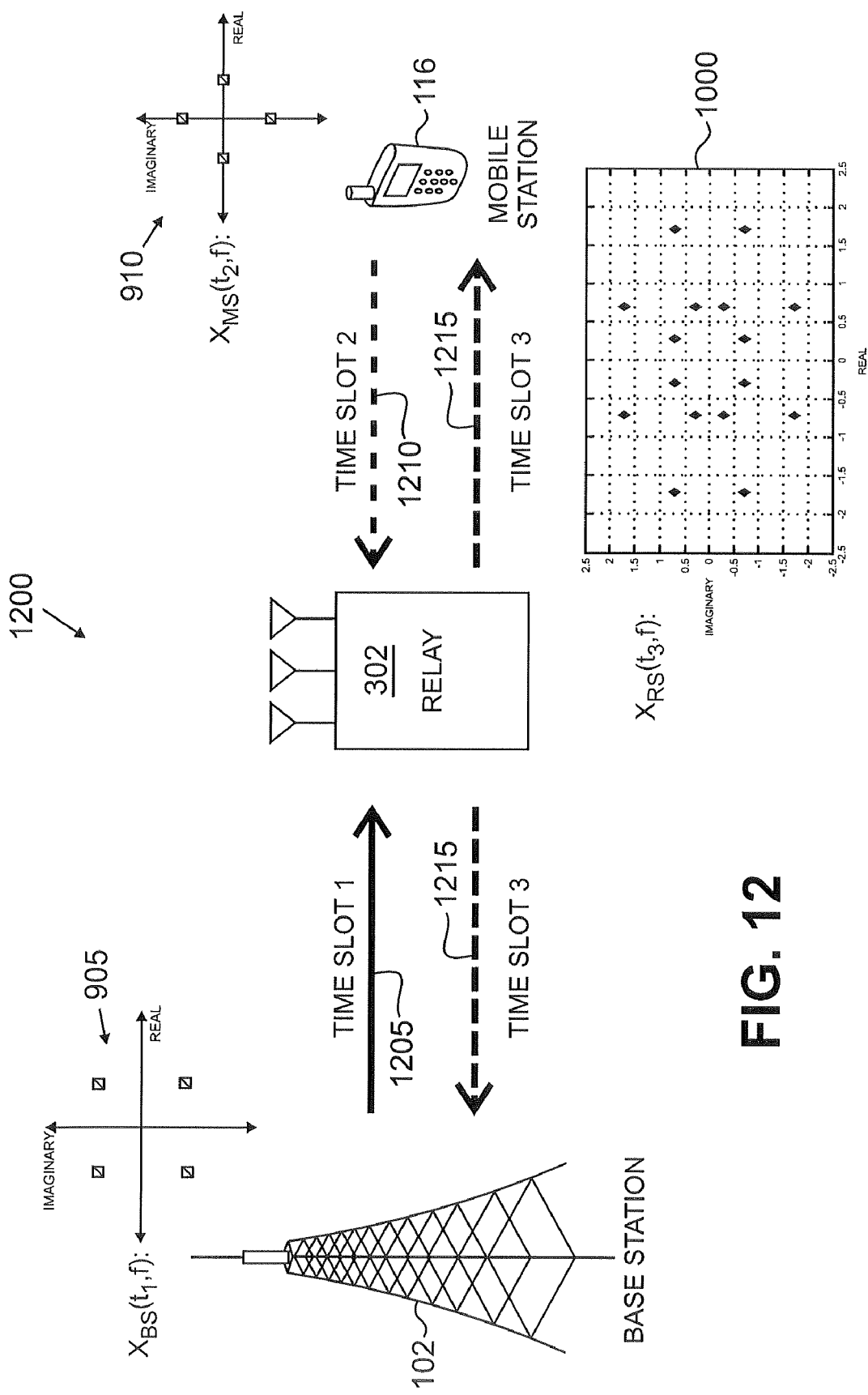
FIG. 12 illustrates symbol level network coding according to embodiments of the present disclosure.

FIG. 12 illustrates symbol level network coding 1200 according to embodiments of the present disclosure. The embodiment of the symbol level network coding 1200 shown in FIG. 12 is for illustration only. Other embodiments of the symbol level network coding 1200 can be used without departing from the scope of this disclosure.

In some embodiments, BS 102 transmits symbols from constellation A 905 in a first time slot $t_1$ 1205. In such embodiments, SS 116 transmits symbols from constellation B 910 in a second time slot $t_2$ 1210. As such, BS 102 and SS 116 transmit their respective symbols in two successive time slots. RS 302 receives symbols from BS 102 and SS 116 on a frequency f in time slots $t_1$ 1205 and $t_2$ 1210, respectively. RS 302 combines the symbols and transmits them on the same resource. For example, RS 302 adds the symbols received from BS 102 to the symbols received from SS 116 to form combined symbols. Then, RS 302 transmits the combined symbols on frequency f in time slot $t_3$ 1215. The transmission of the combined symbols from RS 302 is as if RS 302 is transmitting from the composite constellation C 1000. BS 102 has two options for recovering the data transmitted by SS 116:

BS 102 can decode from the composite constellation C 1000 and map it to the constituent symbols from constellations A 905 and constellation B 910. This mapping recovers the symbol from constellation B 910 transmitted by SS 116 without the need for interference cancellation.

BS 102 can subtract it's transmit symbol (e.g., symbols transmitted by BS 102 during $t_1$ 1205) from the combined symbol to recover the information from SS 116.

SS 116 can perform similar operations to recover information transmitted by BS 102. Accordingly, SS 116 has two options for recovering the data transmitted by BS 102:

SS 116 can decode from the composite constellation C 1000 and map it to the constituent symbols from constellations A 905 and constellation B 910. This mapping recovers the symbol from constellation A 905 transmitted by BS 102 without the need for interference cancellation.

SS 116 can subtract it's transmit symbol (e.g., symbols transmitted by SS 116 during $t_2$ 1210) from the combined symbol to recover the information from BS 102.

In such embodiments, interference cancellation is not required. Accordingly, BS 102 and SS 116 do not rely on interference cancellation as the only means for data recovery but also enables detection using the composite constellation C 1000.

Figure 13:
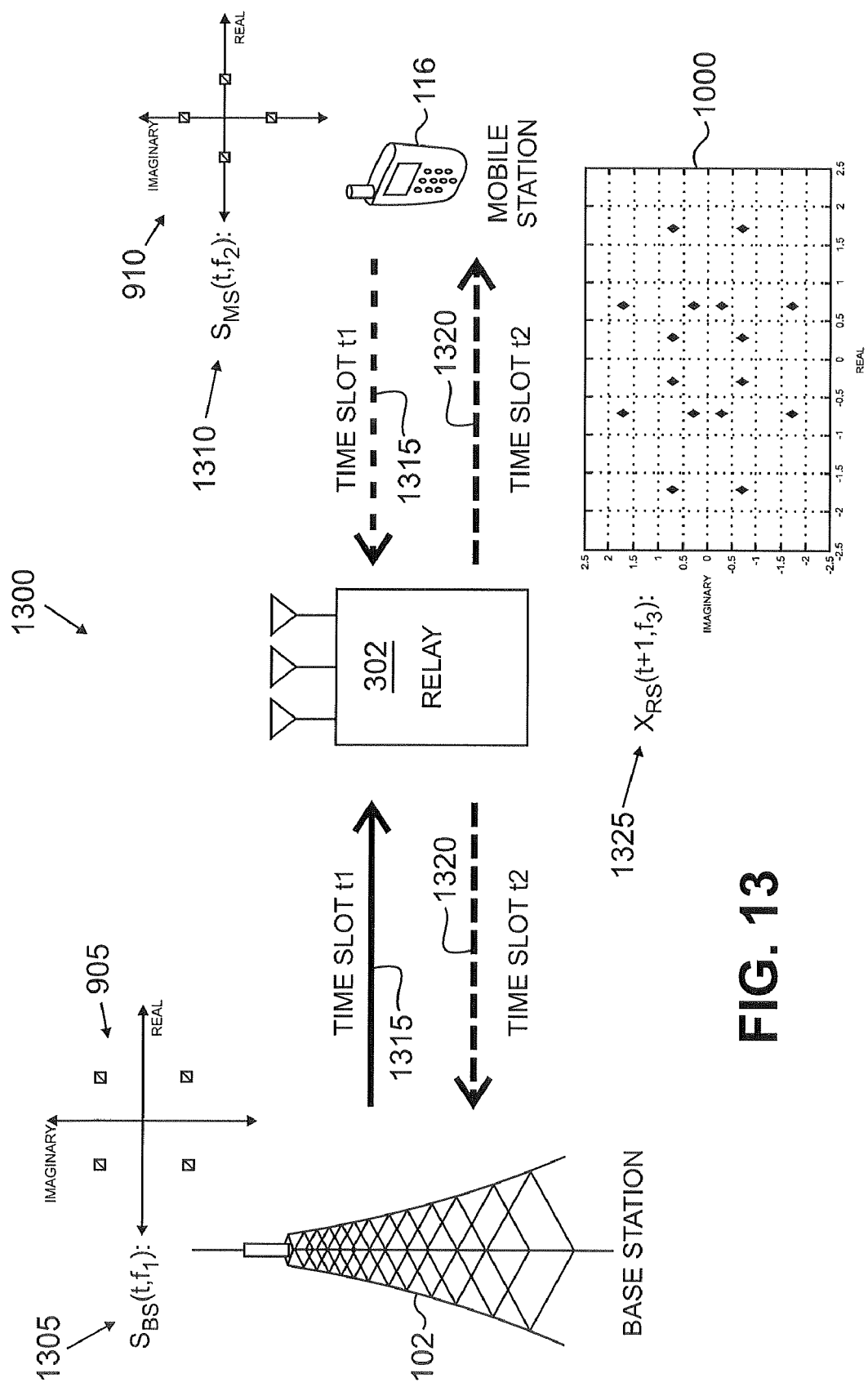
FIG. 13 illustrates symbol level network coding in an FDD system according to embodiments of the present disclosure.

FIG. 13 illustrates symbol level network coding 1300 in an FDD system 400 according to embodiments of the present disclosure. The embodiment of the symbol level network coding 1300 shown in FIG. 13 is for illustration only. Other embodiments of the symbol level network coding 1300 can be used without departing from the scope of this disclosure.

In some embodiments, BS 102 transmits data bearing subcarriers on frequency resource $f_1$ 1305 at time $t_1$ 1315, using symbols from constellation A 905 to RS 302. Additionally, SS 116 transmits data bearing subcarriers on frequency resource $f_2$ 1310 at time $t_1$ 1315, using symbols from constellation B 910 to RS 302. These transmissions assume BS 102 and SS 116 transmit data on two orthogonal frequency resources. For example, in an OFDMA system, these frequencies can be mapped to appropriate subcarrier indices in the OFDM symbols. RS 302 sums the symbols. Then, RS 302 transmits the summed symbols at time $t_2$ 1320 on frequency $f_3$ 1325 to both BS 102 and SS 116. In some embodiments, frequency resource $f_3$ 1325 is the same as one of $f_1$ 1305 and $f_2$ 1310. In some embodiments, frequency resource $f_3$ 1325 overlaps one of $f_1$ 1305 and $f_2$ 1310. In some embodiments, frequency resource $f_3$ 1325 is different than either $f_1$ 1305 or $f_2$ 1310. Orthogonalizing BS 102, SS 116 and RS 302 transmissions in the frequency domain is useful if BS 102, SS 116 and RS 302 support full duplex operations. In contrast to previous physical layer network coding, the current embodiments do not require perfect symbol synchronization since RS 302 and SS 116 transmit on orthogonal frequencies.

Figure 14:
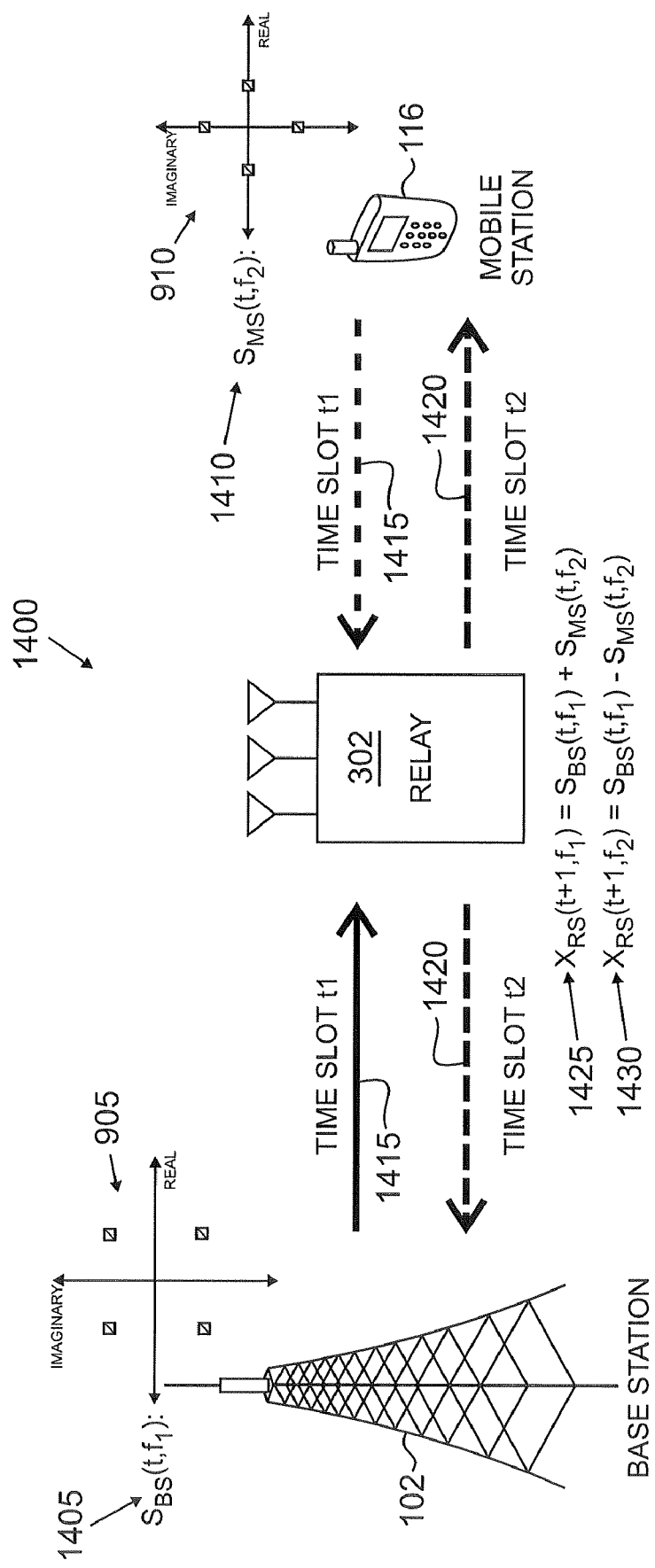
FIG. 14 illustrates another symbol level network coding in an FDD system according to embodiments of the present disclosure.

FIG. 14 illustrates another symbol level network coding 1400 in an FDD system 400 according to embodiments of the present disclosure. The embodiment of the symbol level network coding 1400 shown in FIG. 14 is for illustration only. Other embodiments of the symbol level network coding 1400 can be used without departing from the scope of this disclosure.

In some embodiments, BS 102 transmits data bearing subcarriers on frequency resource $f_1$ 1405 at time $t_1$ 1415, using symbols from constellation A 905 to RS 302. Additionally, SS 116 transmits data bearing subcarriers on frequency resource $f_2$ 1410 at time $t_1$ 1415, using symbols from constellation B 910 to RS 302. At time $t_2$ 1420, RS 302 transmits a first combination 1425 of the symbols on frequency $f_1$ 1405 and a second combination 1430 of the symbols on frequency $f_2$ 1410. RS 302 transmits the first and second combinations of symbols to both BS 102 and SS 116. For example, the first combination 1425 can be the sum of the symbols on frequencies $f_1$ 1405 and $f_2$ 1410 at time $t_1$ 1415, while the second combination 1430 can be the difference between the symbols on frequencies $f_1$ 1405 and $f_2$ 1410 at time $t_1$ 1415. Thus, by transmitting both sum and difference of the symbols from BS 102 and SS 116 in different frequencies, RS 302 provides frequency diversity.

Figure 15:
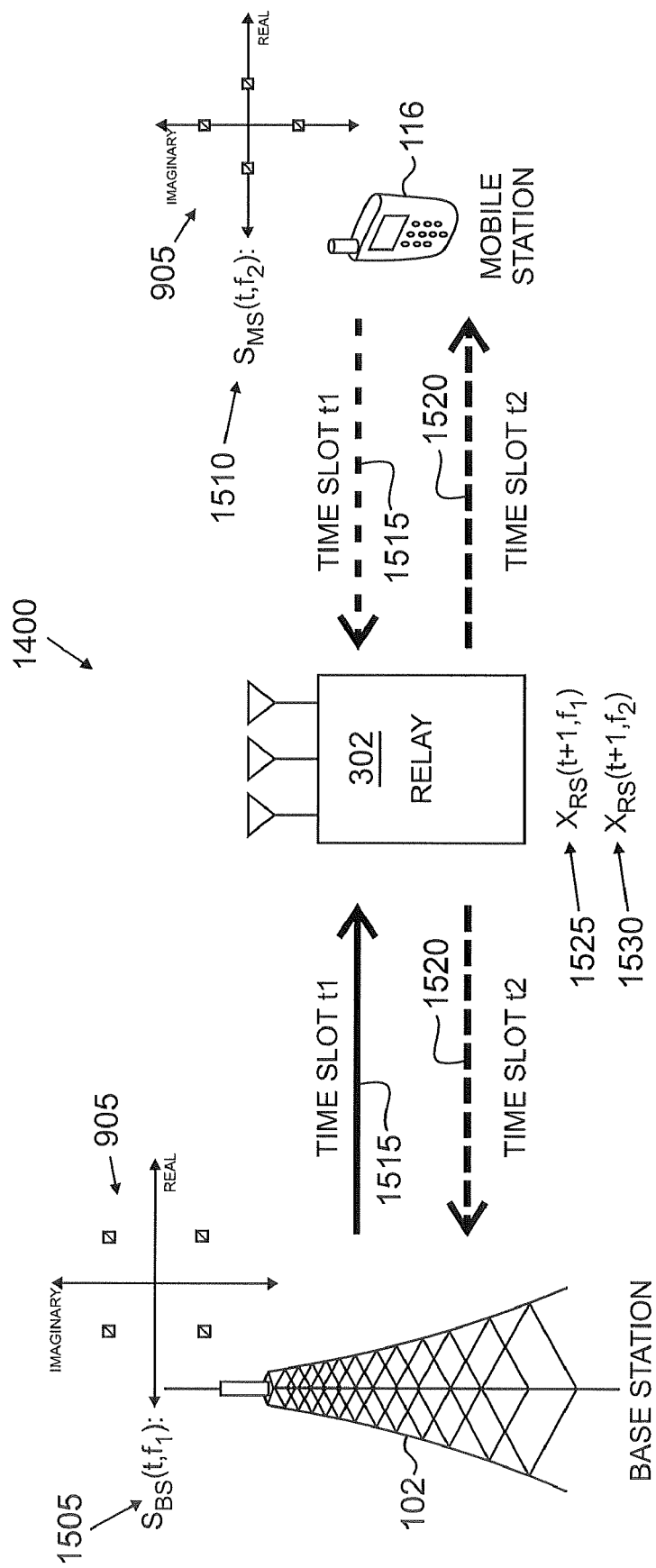
FIG. 15 illustrates a combining matrix coding according to embodiments of the present disclosure.

FIG. 15 illustrates a combining matrix coding 1500 according to embodiments of the present disclosure. The embodiment of the combining matrix coding 1500 shown in FIG. 15 is for illustration only. Other embodiments of the combining matrix coding 1500 can be used without departing from the scope of this disclosure.

In some embodiments, both BS 102 and SS 116 transmit on frequencies $f_1$ and $f_2$ at time $t_1$ 1515 to RS 302. For example, BS 102 transmits on $f_1$ while SS 116 transmits $f_2$. Both BS 102 and SS 116 transmit using symbols from a QPSK constellation A 905. Accordingly, BS 102 and SS 116 need not agree on constellation rotations prior to transmission. Therefore, BS 102 and SS 116 can use standard constellations. RS 302 detects symbols from BS 102 and SS 116 and combines them using a combining matrix. The combining matrix is known to both BS 102 and SS 116.

For example, BS 102 transmits a symbol, $s_{BS}(t_1, f_1)$ 1505, at time $t_1$ 1515 on frequency $f_1$ 1505. SS 116 transmits a symbol, $s_{MS}(t_1, f_2)$ 1510, at time $t_1$ 1515 on frequency $f_2$. RS 302 processes both symbols, $s_{BS}(t_1, f_1)$ 1505 and $s_{MS}(t_1, f_2)$ 1510, using a 2×2 combining matrix M to generate $x_{RS}(t_2, f_1)$ 1520 and $x_{RS}(t_2, f_2)$ 1525. The combining matrix is defined in Equation 2:

$$\begin{bmatrix} x_{RS}(t_2, f_1) \\ x_{RS}(t_2, f_2) \end{bmatrix} = M \begin{bmatrix} s_{BS}(t_1, f_1) \\ s_{MS}(t_1, f_2) \end{bmatrix}.$$  [Eqn. 2]

In some embodiments, the combining matrix M is defined by Equation 3:

$$M = \frac{1}{\sqrt{2}} \begin{bmatrix} 1 & 1 \\ 1 & -1 \end{bmatrix} \begin{bmatrix} 1 & 0 \\ 0 & e^{j\frac{\pi}{4}} \end{bmatrix}.$$  [Eqn. 3]

Therefore, RS 302 uses the matrix M to rotate the symbols from SS 116 and combine both symbols to output their sum and differences. Thus RS 302 transmits $x_{RS}(t_2, f_1)$ 1525 and $x_{RS}(t_2, f_2)$ 1530 to both BS 102 and SS 116. BS 102 uses the knowledge of combining matrix M to recover data transmitted to BS 102. Additionally, SS 116 uses the knowledge of combining matrix M to recover data transmitted to SS 116. In such embodiments, BS 102 and SS 116 only need to know the combining matrix used by RS 302 while the transmission operations at BS 102 and SS 116 remain the same, as in the mode where RS 302 is not present. Thus all the network coding operations are isolated in RS 302 as opposed to being split between BS 102, SS 116 and RS 302 respectively.

In some embodiments, the combining matrix M, included in RS 302, is an anti-identity as defined by Equation 4:

$$M = \begin{bmatrix} 0 & 1 \\ 1 & 0 \end{bmatrix}.$$  [Eqn. 4]

In such embodiments, the resulting implementation is that of subcarrier division duplexed relaying (SD2R). In SD2R, RS 302 receives information from BS 102 on frequency $f_1$ at time $t_1$ 1515. Additionally at time $t_1$ 1515, RS 302 receives information from SS 116 on frequency $f_2$. RS 302, at time instant $t_2$ 1520, transmits the information from SS 116 to BS 102 on frequency $f_1$ and the information from BS 102 to SS 116 on frequency $f_2$. This operation can be described by the matrix operation defined by Equation 5:

$$\begin{bmatrix} x_{RS}(t_2, f_1) \\ x_{RS}(t_2, f_2) \end{bmatrix} = \begin{bmatrix} 0 & 1 \\ 1 & 0 \end{bmatrix} \begin{bmatrix} s_{BS}(t_1, f_1) \\ s_{MS}(t_1, f_2) \end{bmatrix}.$$  [Eqn. 5]

In some embodiments, the symbols from BS 102 and SS 116 are spread over K subcarriers. For example, $$\frac{K}{2}$$

subcarriers may carry data from BS 102 and the rest from SS 116. In such embodiments, the combining matrix M is constructed algebraically using linear constellation precoders. The combining matrix M for any arbitrary size K can be generally written as a Vandermonde matrix as illustrated by Equation 6:

$$M = \frac{1}{\beta} \begin{bmatrix} 1 & a_1 & \cdots & a_1^{K-1} \\ 1 & a_2 & \cdots & a_2^{K-1} \\ \vdots & \vdots & \ddots & \vdots \\ 1 & a_K & \cdots & a_K^{K-1} \end{bmatrix}.$$  [Eqn. 6]

In Equation 6, $\beta$ is a normalization factor chosen to impose the power constraint $tr(MM^H)=K$. The function $tr(A)$ is a trace matrix A. The selection parameters $\{a_K\}_{K=1}^{K}$ depends on K and can be optimized depending on the underlying design criterion. For example, the matrix M that achieves maximum diversity gain and maximum coding gain are algebraically constructed. When K=2, the matrix M in Equation 3 matches that from the algebraic construction. Therefore, the combining matrix M described in Equation 3 is also a diversity maximizing matrix in OFDM systems.

The data from BS 102 and SS 116 spread over K subcarriers need not be evenly distributed. The combining matrix is operable to support uneven split of data bearing subcarriers between BS 102 and SS 116. For example, RS 302 receives data on eight (8) subcarriers. Six (6) subcarriers carry data from the BS 102 and two (2) from the SS 116. In such example, the above preceding can still be used. As such, the data from the SS 116, originally carried in just two (2) subcarriers, is spread over eight (8) subcarriers, thus guaranteeing greater error resilience. RS 302 indicates the choice of the precoder for both BS 102 and SS 116 to recover data. Further in such example, RS 102 indicates that the size of precoder is eight (8). Since BS 102 knows that its data originally was carried on six (6) subcarriers, BS 102 can compute that SS 116 has transmitted on just two (2) subcarriers. BS 102 proceeds to recover the data transmitted by SS 116 on the two (2) subcarriers by either using a maximum likelihood (ML) receiver or using a linear receiver that simply multiplies the received symbols by the inverse of matrix M after equalization. The vector transmitted by RS 302 at time $t_2$ 1520 is denoted as $x_{RS}(t_2)$ and defined by Equation 7:

$$x_{RS}(t_2) = \begin{bmatrix} x_{RS}(t_2, f_1) \\ \vdots \\ x_{RS}(t_2, f_8) \end{bmatrix} = M \begin{bmatrix} s_{BS}(t_1, f_1) \\ \vdots \\ s_{BS}(t_1, f_6) \\ s_{MS}(t_1, f_7) \\ s_{MS}(t_1, f_8) \end{bmatrix}. \quad [\text{Eqn. 7}]$$

Further, in such example, the vector received at BS 102 at time $t_2$ is denoted as $y_{BS}(t_2)$ and defined by Equation 8:

$$y_{BS}(t_2) = H \cdot x_{RS}(t_2) + n(t_2). \quad [\text{Eqn. 8}]$$

In Equation 8, H is the channel matrix and $n(t_2)$ is the additive white Gaussian noise with zero mean and variance $\sigma^2$. After estimating the channel H, BS 102 removes the influence of H on the received symbol by equalization to recover $x_{RS}(t_2)$. BS 102 now has two options to decode $x_{RS}(t_2)$:

1. Use an ML receiver to recover $s_{MS}(t_1, f_7)$ and $s_{MS}(t_1, f_8)$. Since BS 102 knows the symbols $s_{BS}(t_1, f_1)$ through $s_{BS}(t_1, f_8)$, the ML decoding complexity depends only on the constellation size $s_{MS}(t_1, f_7)$ and $s_{MS}(t_1, f_8)$. If both of them are derived from QPSK constellations, then the ML constructs "$4^2=16$" hypotheses and estimates the symbols as $\hat{s}_{MS}(t_1, f_7)$ and $s_{MS}(t_1, f_8)$ based on Equation 9:

$$\begin{bmatrix} \hat{s}_{MS}(t_1, f_7) \\ \hat{s}_{MS}(t_1, f_8) \end{bmatrix} = \arg\min_{i=1,\ldots,16} \left\| \begin{bmatrix} x_{RS}(t_2, f_1) \\ \vdots \\ x_{RS}(t_2, f_8) \end{bmatrix} - M \begin{bmatrix} s_{BS}(t_1, f_1) \\ \vdots \\ s_{BS}(t_1, f_6) \\ s_{MS}(t_1, f_7) \\ s_{MS}(t_1, f_8) \end{bmatrix} \right\|_F^2 \quad [\text{Eqn. 9}]$$

In Equation 9, $\| \|_F^2$ is the Frobenius norm of matrices. The ML searches over the entire search space and extracts complete diversity gain.

2. Use a linear receiver to recover $s_{MS}(t_1, f_7)$ and $s_{MS}(t_1, f_8)$. Since, BS 102 has knowledge of the combining matrix M, which is an invertible matrix, BS 102 pre-multiplies the receiver vector $x_{RS}(t_2)$ by $M^{-1}$ and recovers the symbols from subcarriers $f_7$ and $f_8$.

Both receiver options are available to SS 116 to recover the symbols $s_{BS}(t_1, f_1)$ through $s_{BS}(t_1, f_8)$ transmitted by BS 102.

Figure 16:
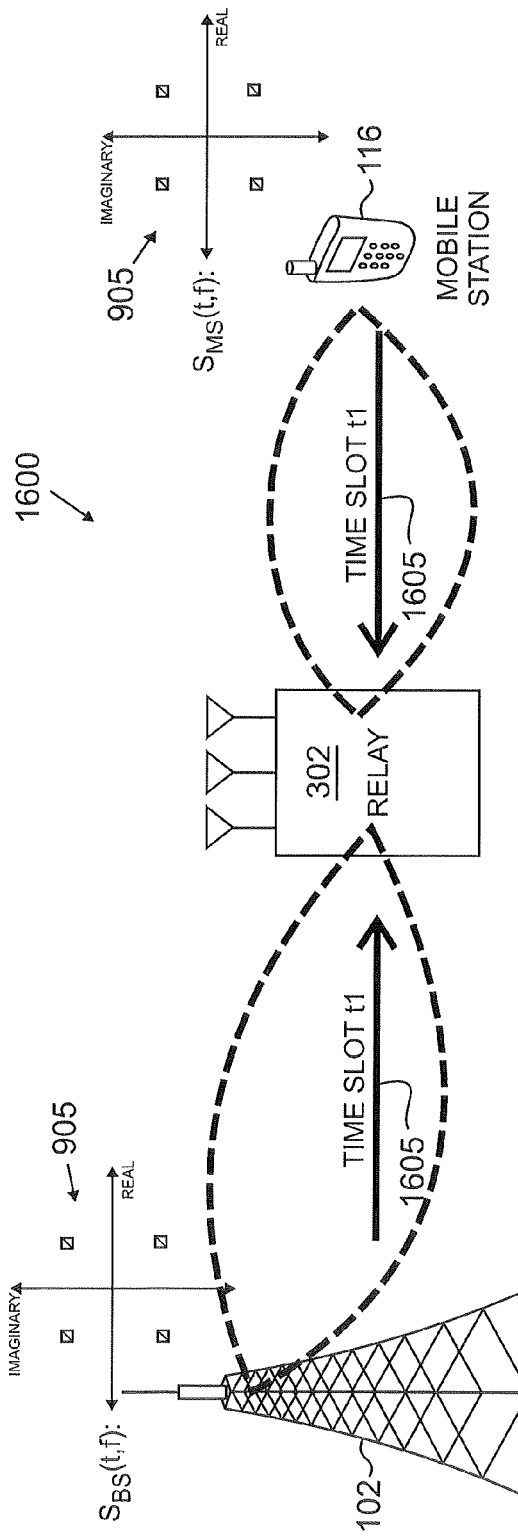
FIG. 16 illustrates an additional symbol level network coding in a spatial multiplexing (SM) or space division multiple access (SDMA) system according to embodiments of the present disclosure.
Figure 16:
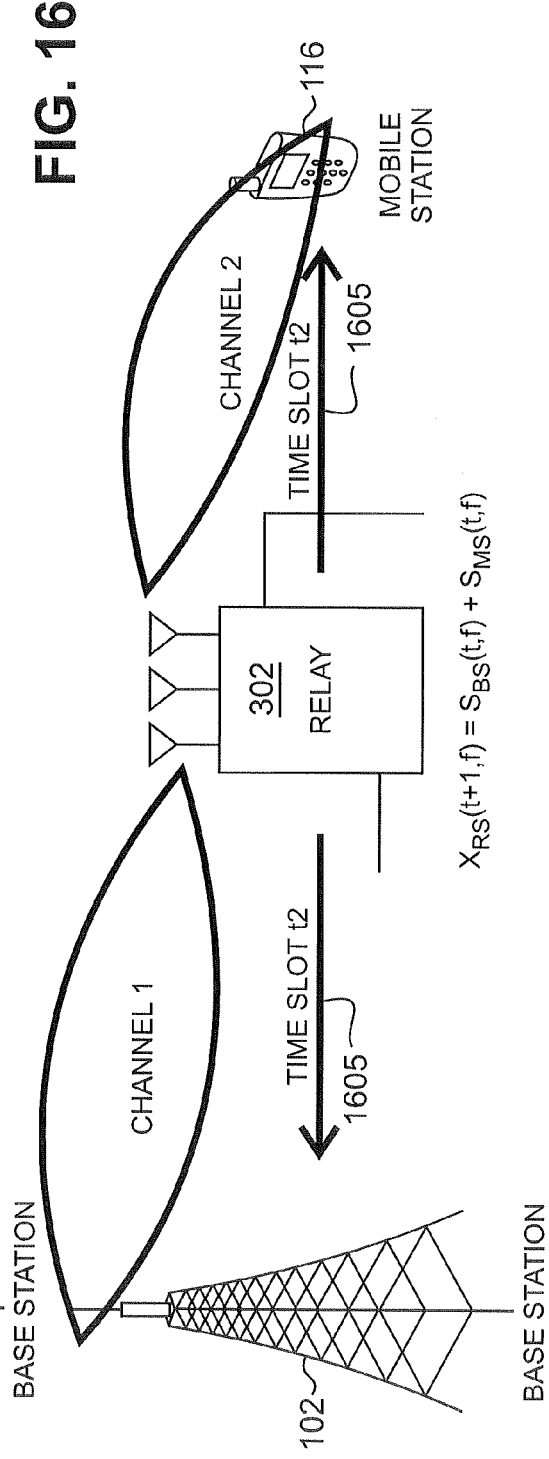

FIG. 16 illustrates an additional symbol level network coding 1600 in a spatial multiplexing (SM) or space division multiple access (SDMA) system 600 according to embodiments of the present disclosure. The embodiment of the symbol level network coding 1600 shown in FIG. 16 is for illustration only. Other embodiments of the symbol level network coding 1600 can be used without departing from the scope of this disclosure.

In some embodiments, RS 302, BS 102 and SS 116 are equipped with multiple antennas and configured to perform spatial multiplexing (SM) or space division multiple access (SDMA). In such embodiments, RS 302 receives data at time slot $t_1$ from both BS 102 and SS 116 on the same subcarriers.

Using spatial separation, RS 302 distinguishes the data from BS 102 and SS 116. As shown in FIG. 16, in time slot $t_1$ 1605, both BS 102 and SS 116 transmit to RS 302 on the same frequency resource. The signals from BS 012 and SS 116 can be separated in spatial domain. RS 302 receives and processes the signals from BS 102 and SS 116. RS 302 applies network coding techniques to combine the signals from BS 102 and SS 116. For example, any of the network coding techniques illustrated in FIGS. 7-15 can be used. In time slot $t_2$ 1610, RS 302 transmits the combination of the symbols as a single message to both BS 10 and SS 116 on the same subcarriers. In some embodiments, the signal from BS 102, the signal from SS 116, and the signal from RS 302 are carried on one or multiple layers or antennas. In order to recover the message from SS 116, BS 10 subtracts its symbol from the combination of symbols received from RS 302. This embodiment illustrates that, in addition to the application of network coding on resources in time and frequency, network coding 1600 can be used with resources in spatial dimension.

Figure 17:
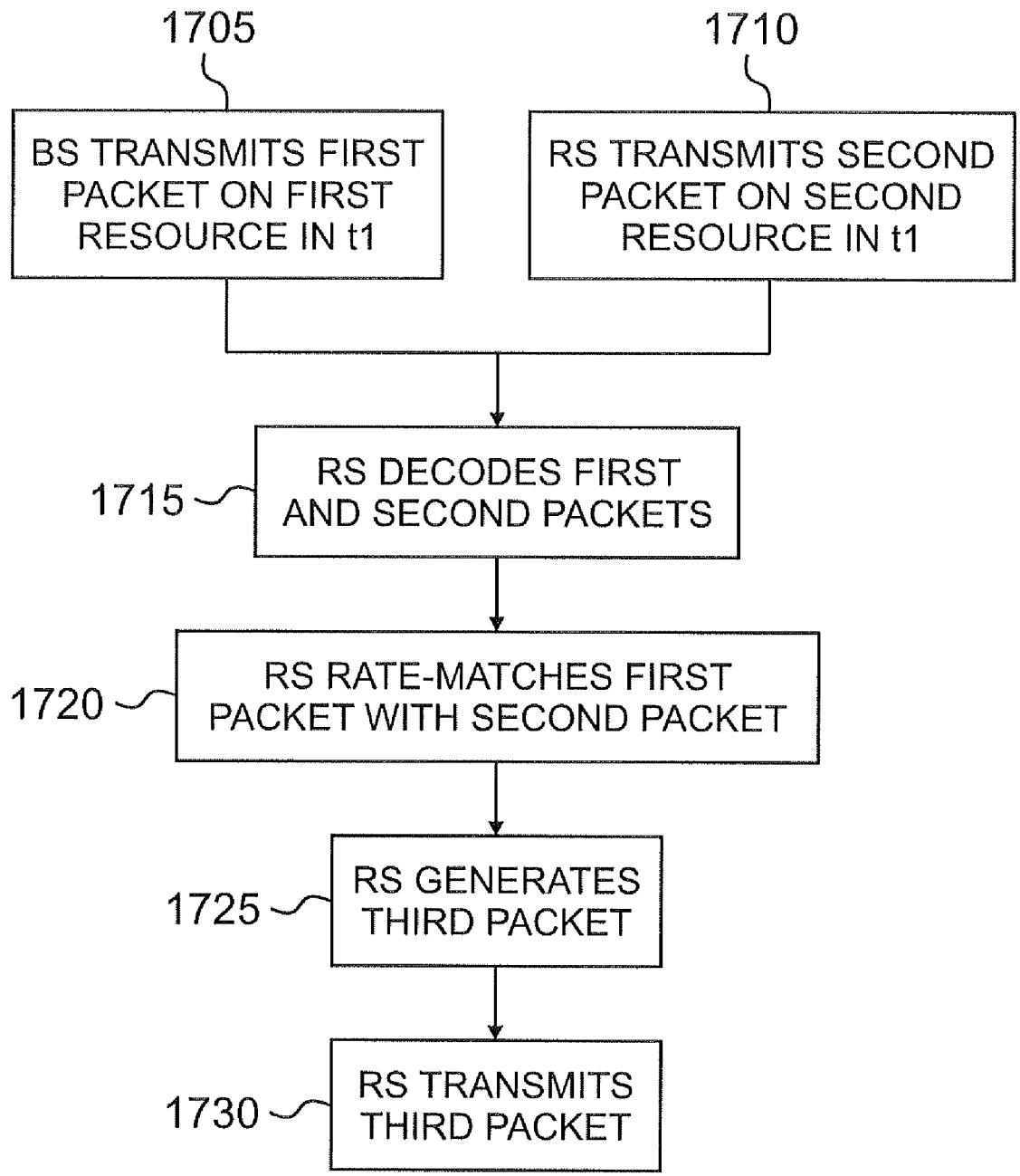
FIGS. 17-18 illustrate processes for rate matching according to embodiments of the present disclosure.
Figure 18:
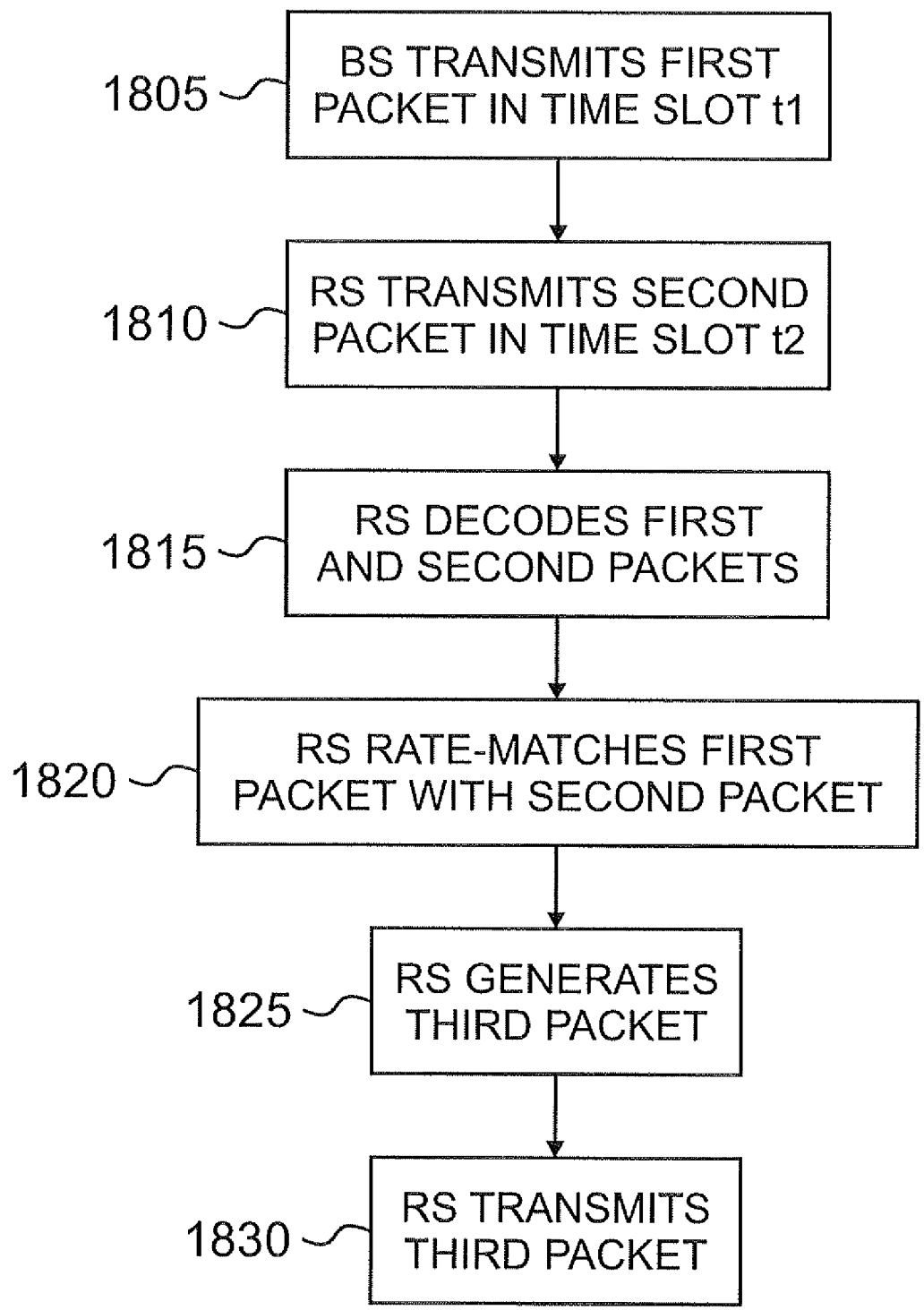

FIGS. 17-18 illustrate processes for rate matching according to embodiments of the present disclosure. The embodiments of the processes shown in FIGS. 17-18 are for illustration only. Other embodiments of the processes can be used without departing from the scope of this disclosure.

In some embodiments, illustrated in FIG. 17, RS 302 is configured to perform rate matching. Rate-matching is performed when the size of a first packet (e.g., received from BS 102) does not match the size of a second packet (e.g., received from SS 116). For example, the second packet may be smaller than the first packet. It will be understood that illustration of the second packet being smaller is for example purposes only examples wherein the second packet is larger than the first is within the scope of this disclosure. RS 302 is configured to repeat at least a portion of the second packet as many times as required in order to make the size of the second packet equal the size of the first packet. In such embodiment, BS 102 and SS 116 are aware, or informed, of the method of rate matching to be performed by RS 302.

BS 102 transmits a first packet to RS 302 on a first resource in a first time slot $t_1$ in step 1705. The first packet contains a first number of information bits. In step 1710 SS 116 transmits a second packet, which contains a second number of information bits, to RS 302 on a second resource in the first time slot $t_1$. RS 302 decodes the first packet and the second packet in step 1715. RS 302 rate-matches the first packet with the second packet in step 1720. In step 1725, RS 302 generates a third packet that is network-coded between the first packet and the second packet after the rate matching. Then, in step 1730, RS 302 transmits the third packet in a second time slot, $t_2$, on a third resource. In some embodiments, the third resource is the same as one of the first and second resources. In some embodiments, the third resource overlaps one of the first and second resources. In some embodiments, the third resource is different than either the first or second resource. By performing rate-matching between the first packet and the second packet at RS 302, this scheme enables network-coding for a packet with a different number of information bits.

For example, the rate-matcher at RS 302 repeats the packet with a smaller number of information bits to match with the packet with a larger number of information bits. A network encoder XOR's the rate-matched bits on a bit-wise fashion and generates the third packet. RS 302 then further processes the third packet, e.g., by forward error correction (FEC) coding—also known as channel encoding—and transmits the third packet. Similarly, each of BS 102 and SS 116 include corresponding rate-matching or de-rate-matching apparatus. Further each of BS 102 and SS 116 are configured to receive the third packet and extract the information of the first packet or the second packet respectively. As an additional example, a first packet is intended for the SS 116. In order for SS 116 to decode the information in the first packet, the SS 116 rate-matches the second packet with the received third packet and performs the network decoding to extract the information bits of the first packet.

In some embodiments illustrated in FIG. 18, BS 102 transmits a first packet to RS 302 in a first time slot $t_1$ in step 1805. The first packet contains a first number of information bits. In step 1810, SS 116 transmits a second packet to RS 302 in a second time slot $t_2$. The second packet contains a second number of information bits. In step 1815, RS 302 decodes the first packet and the second packet. RS 302 rate-matches the first packet with the second packet in step 1820. In step 1825, RS 302 generates a third packet that is network-coded between the first packet and the second packet after the rate matching. Then, in step 1830, RS 302 transmits the third packet in a third time slot $t_3$.

In some embodiments, BS 102 transmits a first packet to RS 302 on a first resource in a first time slot $t_1$. The first packet contains a first number of modulation symbols. SS 116 transmits a second packet to RS 302 on a second resource in the first time slot $t_1$. The second packet contains a second number of modulation symbols. RS 302 rate-matches the first packet with the second packet. RS 302 generates a third packet that is network-coded between the first packet and the second packet after the rate matching. RS 302 transmits the third packet in a second time slot, $t_2$, on a third resource. In some embodiments, the third resource is the same as one of the first and second resources. In some embodiments, the third resource overlaps one of the first and second resources. In some embodiments, the third resource is different than either the first or second resource. By performing rate-matching between the first packet and the second packet at RS 302, this scheme enables network-coding for packet with different number of modulation symbols.

For example, the rate-matcher at RS 302 repeats the packet with a smaller number of modulation symbols to match with the packet with a larger number of modulation symbols. A network encoder, included in RS 302, combines the rate-matched modulation symbols on a symbol-wise fashion and generates the third packet. RS 302 then further processes and transmits the third packet. Similarly, each of BS 10 and SS 116 include corresponding rate-matching or de-rate-matching apparatus. Further, each of BS 102 and SS 116 are configured to receive the third packet and extract the information of the first packet or the second packet respectively.

In some embodiments, BS 102 transmits a first packet to RS 302 in a first time slot $t_1$. The first packet contains a first number of modulation symbols. SS 116 transmits a second packet to RS 320 in a second time slot $t_2$. The second packet contains a second number of modulation symbols. RS 302 rate-matches the first packet with the second packet. RS 302 generates a third packet that is network-coded between the first packet and the second packet after the rate matching. RS 320 transmits the third packet in a third time slot $t_3$.

In some embodiments, relaying is performed by MRS 304. In such embodiments, MRS 304 is operable to perform the same, or similar functions as RS 302, described above with respect to FIGS. 7-18. Further, MRS 304 can be a subscriber station, such as SS 111, SS 112, SS 113, SS 114, SS 115 and SS 116. For example, SS 113 may also operate as a relay station. In such embodiments, SS 113 transmits its constellation to base station 102 and SS 116. Base station 102 detects the constellation. Additionally, SS 116 detects its constellation. In such embodiments, SS 113 receives data from BS 102 using constellation A 905. SS 113 also receives data from SS 116 using constellation B 910. SS 113 is configured to combine (e.g. network-code) the constellation A 905 and constellation B 910 using any of the network coding methods described herein above. Further, SS 113 can combine its own constellation to the combination of constellation A 905 and constellation B 910. SS 113 transmits the resulting combination of constellation A 905, constellation B 910 and SS 113's constellation to BS 102 and SS 116. Each of BS 102 and SS 116 previously detected SS 113's constellation. Thus, BS 102 is configured to recover the data from SS 116 as described herein above (e.g., as described with respect to FIG. 12). Further, SS 116 is configured to recover the data from SS 116 as described herein above. Each of BS 102 and SS 116 are able to use the detected constellation from SS 113 and their own constellation to recover the data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a relay station capable of relaying communications between a base station and a subscriber station, the relay station comprising:
    a plurality of receiver antennas configured to receive a first communication from the base station and a second communication from the subscriber station;
    a plurality of transmitter antennas configured to transmit a third communication to each of the base station and the subscriber station; and
    a network encoder configured to generate a combined symbol constellation by combining, using addition at the symbol level, a first symbol constellation containing a plurality of points thereon transmitted in the first communication with a second symbol constellation containing a plurality of points thereon transmitted in the second communication, wherein the third communication comprises the combined symbol constellation.

2. The relay station as set forth in claim 1, wherein prior to combining, the network encoder rotates at least one of the first symbol constellation and the second symbol constellation.

3. The relay station as set forth in claim 1, wherein the first communication is received on a first resource, the second communication is received on a second resource, and the third communication is transmitted at a third resource.

4. The relay station as set forth in claim 3, wherein the first communication and the second communication are received in a first time interval, and the third communication is transmitted in a second time interval.

5. For use in a wireless communications network, a relay station capable of relaying communications between a base station and a subscriber station, the relay station comprising:
    a plurality of receiver antennas configured to receive a first communication from the base station and a second communication from the subscriber station;
    a plurality of transmitter antennas configured to transmit a third communication to each of the base station and the subscriber station; and
    a network encoder configured to generate a combined symbol constellation by combining a first symbol constellation transmitted in the first communication with a second symbol constellation transmitted in the second communication, wherein the third communication comprises the combined symbol constellation, and
    wherein the combined symbol constellation comprises:

a sum of the first symbol constellation and the second symbol constellation; and
a difference of the first symbol constellation and the second symbol constellation.

6. The relay station as set forth in claim 1, wherein the network encoder is configured to use a combining matrix to generate the combined symbol constellation.

7. The relay station as set forth in claim 1, further comprising a rate matcher configured to rate-match the first communication with the second communication.

8. A wireless communication network comprising a plurality of relay stations, each one of the relay stations capable of relaying communications between a base station and a subscriber station, at least one of the relay stations comprising:
a plurality of receiver antennas configured to receive a first communication from the base station and a second communication from the subscriber station;
a plurality of transmitter antennas configured to transmit a third communication to each of the base station and the subscriber station; and
a network encoder configured to generate a combined symbol constellation by combining, using addition at the symbol level, a first symbol constellation containing a plurality of points thereon transmitted in the first communication with a second symbol constellation containing a plurality of points thereon transmitted in the second communication, wherein the third communication comprises the combined symbol constellation.

9. The wireless communication network as set forth in claim 8, wherein prior to combining, the network encoder rotates at least one of the first symbol constellation and the second symbol constellation.

10. The wireless communication network as set forth in claim 8, wherein the first communication is received on a first resource, the second communication is received on a second resource, and the third communication is transmitted at a third resource.

11. The wireless communication network as set forth in claim 10, wherein the first communication is received on a first frequency, the second communication is received on a second frequency, and the plurality of transmitters is configured to transmit the third communication on a third frequency.

12. A wireless communication comprising a plurality of relay stations, each one of the relay stations capable of relaying communications between a base station and a subscriber station, at least one of the relay stations comprising:
a plurality of receiver antennas configured to receive a first communication from the base station and a second communication from the subscriber station;
a plurality of transmitter antennas configured to transmit a third communication to each of the base station and the subscriber station; and
a network encoder configured to generate a combined symbol constellation by combining a first symbol constellation transmitted in the first communication with a second symbol constellation transmitted in the second communication, wherein the third communication comprises the combined symbol constellation,
wherein the combined symbol constellation comprises:
a sum of the first symbol constellation and the second symbol constellation, and
a difference of the first symbol constellation and the second symbol constellation.

13. The wireless communication network as set forth in claim 8, wherein the network encoder is configured to use a combining matrix to generate the combined symbol constellation.

14. The wireless communication network as set forth in claim 8, further comprising a rate matcher configured to rate-match the first communication with the second communication.

15. For use in a wireless communications network capable of multi-hop communications, a method of relaying communications between a base station and a subscriber station, the method comprising:
receiving a first communication from a base station and a second communication from a subscriber station, wherein the first communication comprises a first symbol constellation and the second communication comprises a second symbol constellation;
combining, by adding at the symbol level, the first symbol constellation containing a plurality of points thereon with the second symbol constellation containing a plurality of points thereon to generate a third symbol constellation; and
transmitting the third symbol constellation to each of the base station and the subscriber station.

16. The method as set forth in claim 15, further comprising at least one of:
rotating the second symbol constellation; and
using a combining matrix.

17. The method as set forth in claim 16, wherein the combining matrix is an anti-identity matrix.

18. For use in a wireless communications network capable of multi-hop communications, a method of relaying communications between a base station and a subscriber station, the method comprising:
receiving a first communication from a base station and a second communication from a subscriber station, wherein the first communication comprises a first symbol constellation and the second communication comprises a second symbol constellation;
combining, at the symbol level, the first symbol constellation with the second symbol constellation to generate a third symbol constellation; and
transmitting the third symbol constellation to each of the base station and the subscriber station,
wherein the third symbol constellation comprises:
a sum of the first symbol constellation and the second symbol constellation, and
a difference of the first symbol constellation and the second symbol constellation.

19. The method as set forth in claim 15, further comprising receiving the first communication and second communication in a first time interval.

20. The method as set forth in claim 15, further comprising rate-matching the first communication with the second communication.

* * * * *